(12) United States Patent
Yamashita et al.

(10) Patent No.: US 7,161,614 B1
(45) Date of Patent: Jan. 9, 2007

(54) DEVICE AND METHOD FOR CONVERTING TWO-DIMENSIONAL VIDEO TO THREE-DIMENSIONAL VIDEO

(75) Inventors: Syugo Yamashita, Kadoma (JP); Haruhiko Murata, Takatsuki (JP); Toshiya Iinuma, Kadoma (JP); Mitsuo Nakashima, Neyagawa (JP); Takayuki Mori, Shiga (JP)

(73) Assignee: Sanyo Electric Co., Ltd., Osaka (JP)

( * ) Notice: Subject to any disclaimer, the term of this patent is extended or adjusted under 35 U.S.C. 154(b) by 1139 days.

(21) Appl. No.: 10/130,427

(22) PCT Filed: Nov. 24, 2000

(86) PCT No.: PCT/JP00/08315

§ 371 (c)(1),
(2), (4) Date: May 17, 2002

(87) PCT Pub. No.: WO01/39512

PCT Pub. Date: May 31, 2001

(30) Foreign Application Priority Data

| Nov. 26, 1999 | (JP) | 11-336824 |
| Mar. 2, 2000 | (JP) | 2000-058047 |
| Apr. 11, 2000 | (JP) | 2000-109210 |
| Apr. 11, 2000 | (JP) | 2000-109211 |

(51) Int. Cl.
*H04N 13/00* (2006.01)

(52) U.S. Cl. .............. 348/42; 348/51; 348/46; 348/699; 348/575; 382/154; 382/285; 382/277

(58) Field of Classification Search .......... 348/42, 348/51, 46, 699, 575; 382/154, 285, 277
See application file for complete search history.

(56) References Cited

U.S. PATENT DOCUMENTS 5,673,081 A * 9/1997 Yamashita et al. ............ 348/42

FOREIGN PATENT DOCUMENTS

| EP | 0 665 697 A2 | 8/1995 |
| EP | 0 665 697 A3 | 8/1995 |
| JP | 11-98527 | 4/1999 |
| JP | 11-98530 | 4/1999 |
| WO | WO99/12127 A1 | 3/1999 |

OTHER PUBLICATIONS

Supplemental European Search Report dated Jan. 21, 2003.

* cited by examiner

*Primary Examiner*—Shawn S. An
(74) *Attorney, Agent, or Firm*—McDermott Will & Emery LLP

(57) ABSTRACT

There is provided parallax correction means for correcting a parallax for each area calculated by parallax calculation means in accordance with the magnitude of a motion vector for the area detected by motion vector detection means in order to prevent the three-dimensional effect of a conversion video from greatly differing depending on an input video when the MTD method and the CID method are simultaneously used.

When a depth estimate is converted into a parallax, the depth estimate is subjected to distance scale conversion in order to suppress the distortion of the conversion image, to find a tentative target phase for each parallax calculation area, and a dynamic range in which a phase difference between the parallax calculation areas is within a distortion allowable range is searched for and is subjected to distance scale conversion, to find a tentative target phase, which operations are repeated.

8 Claims, 23 Drawing Sheets

FIG. 4
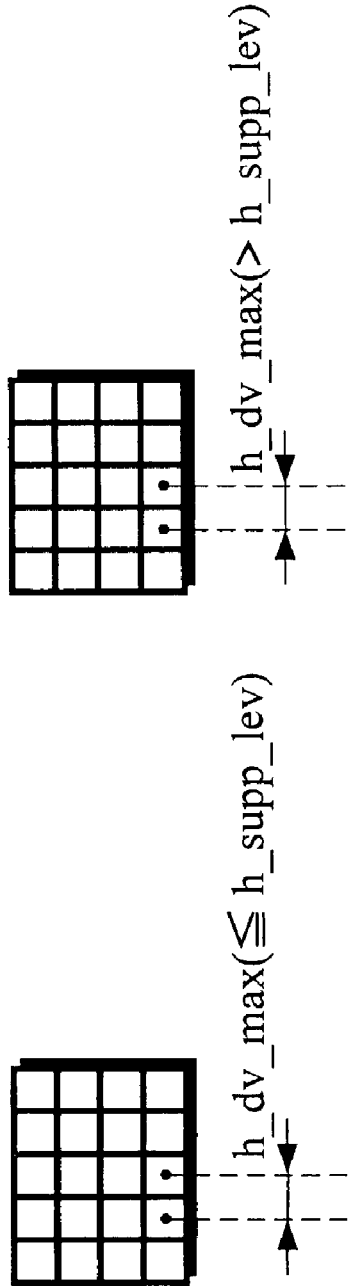
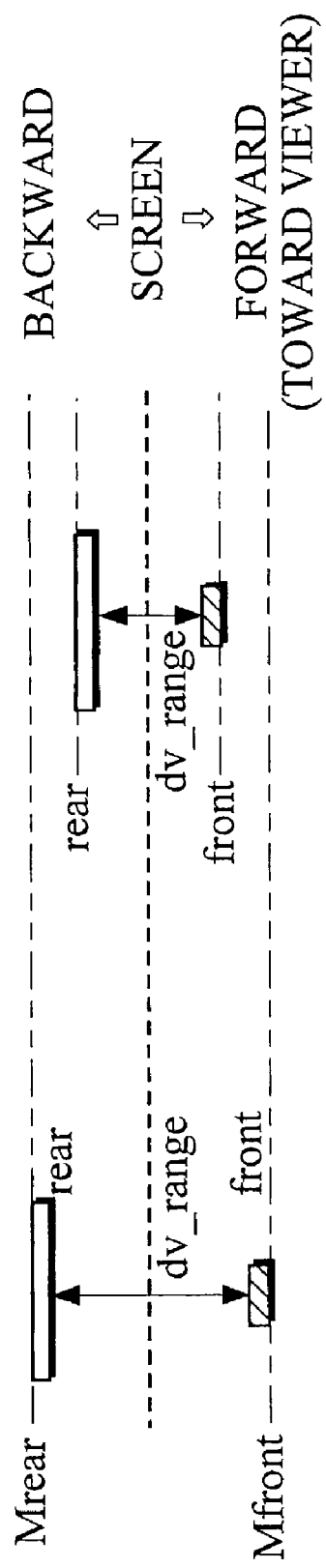

DEVICE AND METHOD FOR CONVERTING TWO-DIMENSIONAL VIDEO TO THREE-DIMENSIONAL VIDEO

TECHNICAL FIELD

The present invention relates to a device for and a method of converting a two-dimensional video into a three-dimensional video.

BACKGROUND ART

As a method of converting a two-dimensional video into a three-dimensional video, methods disclosed in JP-A-9-107562 and JP-A-10-51812 have been known.

The outline of the method of converting a two-dimensional video into a three-dimensional video, which is disclosed in JP-A-9-107562, will be first described on the basis of FIG. 1.

In a two-dimensional video (2D video), a state where a bird is flying from the left to the right in front of a mountain shall be picked up, as shown in images 1 to 5.

A motion vector between images, for example, a motion vector in the case of transition from the image 1 to the image 2 or a motion vector for transition from the image 2 to the image 3, is extracted for each of a plurality of motion vector detection areas set in a screen. A subject (bird) area and a background (mountain) area are then determined from the extracted motion vector. A reference image is determined to be one of a right eye image and a left eye image, and an image which is delayed by several fields corresponding to the magnitude of the motion vector is determined to be the other eye image such that a subject is located ahead of a background.

When it is assumed that the current image which is the reference image is the image 4, and an image (a delayed image) which is delayed by a predetermined number of fields depending on the magnitude of a motion vector obtained from the image 3 and the image 4 is the image 2, the reference image (the image 4) and the delayed image (the image 2) are respectively presented as a left eye image and a right eye image in the direction of the motion vector.

The operations are repeatedly performed, thereby displaying a video having a stereoscopic effect, that is, a three-dimensional video. This method shall be referred to as the MTD method.

The concept of the method of converting a two-dimensional video into a three-dimensional video, which is disclosed in JP-A-10-51812, will be described.

First, a two-dimensional image is divided into a plurality of areas, and image features such as a chrominance component, a high-frequency component, and a contrast are extracted for each of the areas obtained by the division. The areas obtained by the division are then grouped by areas to which the same object belongs on the basis of the chrominance component. A depth is estimated for the areas obtained by the grouping depending on information related to the average contrast and the average high-frequency component in the areas, to calculate a parallax. A left eye image and a right eye image are horizontally shifted in the opposite directions for the areas obtained by the grouping on the basis of the calculated parallax, to produce a three-dimensional video.

The left eye video and the right eye video, which are thus produced, are stereoscopically displayed on stereoscopic display means. This method shall be referred to as the CID method.

The MTD method and the CID method will be described in more detail.

1. MTD Method

In the MTD method, a video entering either one of the right and left eyes is delayed depending on the movement thereof in a screen, to produce a stereoscopic effect. In this case, a field delay (to be a target) (a target delay dly_target) most suitable for the video is determined by the following equation (1) using an average of horizontal vectors in a subject area obj_xvec [pixel/field] and a horizontal vector in a background area bg_xvec [pixel/field] which are obtained by subject/background judgment. The vector takes a positive value with respect to rightward movement.

$$\text{dly\_target} = \text{Mdly\_sisa}/(\text{obj\_xvec} - \text{bg\_xvec}) \text{ [field]} \quad (1)$$

Here, Mdly_sisa indicates a parallax [pixel] for determining a stereoscopic effect produced by the MTD method, and its value is previously set through a user interface or the like.

The direction of delay showing which of the videos entering the right and left eyes should be delayed is determined by the following equation (2) using the target delay dly_target:

$\text{dly\_target} > 0$ . . . delay of right eye $\text{dly\_target} < 0$ . . . delay of left eye $$\text{dly\_target} = 0 \text{ . . . no delay} \quad (2)$$

Although the delay was described, taking the target delay as an example for convenience, the number of fields by which the video is delayed and the direction of delay are determined by a real delay obtained by smoothing the target delay on a time basis.

2. Subject Position Control

Subject position control is employed in order to correct ambiguity, concerning the position where an object is presented relative to a screen, created when the MTD method is carried out. That is, in the MTD method, how a video is seen differs depending on which of a subject and a background moves, as shown in FIG. 2. In the subject position control, when the subject moves, the overall screen is moved backward by shifting the position where a right eye video is presented to the right and shifting the position where a left eye video is presented to the left so that the number of pixels from the subject to the screen is equal to the number of pixels from the screen to the background. On the other hand, when the background moves, the overall screen is moved forward by shifting the position where a right eye video is presented to the left and shifting the position where a left eye video is presented to the right so that the number of pixels from the subject to the screen is equal to the number of pixels from the screen to the background.

A horizontal phase t_phr of the right eye and a horizontal phase t_phl of the left eye, which are calculated by the subject position control, can be expressed by the following equation (4) when a phase obj_sisa of the subject and a phase bg_sisa of the background, which are produced by a field delay, are expressed by the following equation (3):

$\text{obj\_sisa} = \text{obj\_xvec} * \text{delay}$ [pixel]

$$\text{bg\_sisa} = \text{bg\_xvec} * \text{delay} \text{ [pixel]} \quad (3)$$

$\text{t\_phr} = (\text{obj\_sisa} + \text{bg\_sisa})/2$ [pixel]

$$\text{t\_phl} = -\text{t\_phr} \text{ [pixel]} \quad (4)$$

Since the real delay is obtained by smoothing the target delay dly_target on a time basis, the absolute value of a parallax dly_sisa (=obj_sisa−bg_sisa) [pixel] produced by the MTD method (dly_sisa takes a positive value when the subject is projected, while taking a negative value when it is recessed) does not completely coincide with Mdly_sisa [pixel] previously determined by user setting. When there is no delay (dly_target=0), dly_sisa=0.

3. CID Method

The CID method is a method of dividing one screen into a plurality of areas, estimating a depth for each of the areas from image information obtained from the area and a composition, and shifting each of pixels in the screen on the basis of the estimated depth, to produce a binocular parallax.

The applicant of the present invention has also developed a CID method which is a further improvement of the CID method already developed.

FIG. 3 shows the procedure for control in the CID method after the improvement (which is not known).

First, one screen is divided into a plurality of areas, and information related to a high frequency, a contrast of luminance, and a chrominance (B-Y, R-Y) component are obtained from each of the areas (step 1). A depth estimate for each of the areas, which has been estimated from the information and the composition, is found (step 2). When the found depth estimate is merely converted into a shift amount, a distortion is noticeable in a conversion image, thereby performing distortion suppression processing (step 3). The depth estimate after the distortion suppression processing is subjected to distance scale conversion (step 4).

The distortion suppression processing will be described. In the CID method, a 2D image is deformed, to produce left and right images. When the deformation is too large, an unnatural video is obtained. In the CID method, therefore, control is carried out such that the difference in phase between the adjacent areas is not more than a distortion allowable range h_supp_lev [Pixel] of a conversion image which is previously determined by a user. That is, the difference in phase between the adjacent areas is found from phases for the areas which are found by assigning the estimated depth to the distance between Mfront and Mrear. The maximum value of the difference is taken as h_dv_max [pixel]. When h_dv_max exceeds the distortion allowable range h_supp_lev [pixel], Mfront and Mrear are reduced in the direction nearer to 0 [pixel] until the following equation (5) is satisfied:

$$\text{h\_dv\_max} \leq \text{h\_supp\_lev} \tag{5}$$

When h_dv_max is larger than h_supp_lev, therefore, a projection phase front [Pixel] and a recession phase rear [Pixel] of the conversion image are made smaller than the maximum projection phase Mfront [Pixel] and the maximum recession phase Mrear [Pixel] which are previously determined by the user by a linear operation expressed by the following equation (6), as illustrated in a diagram on the right side of FIG. 4.

$$\text{front} = \text{Mfront} * \text{h\_supp\_lev}/\text{h\_dv\_max for h\_dv\_max} > \text{h\_supp\_lev}$$

$$\text{rear} = \text{Mrear} * \text{h\_supp\_lev}/\text{h\_dv\_max for h\_dv\_max} > \text{h\_supp\_lev} \tag{6}$$

Conversely, when h_dv_max is smaller than h_supp_lev, the distortion of the conversion image is within the allowable range. Accordingly, the following equation (7) holds, as illustrated in a drawing on the left side of FIG. 4:

$$\text{front} = \text{Mfront for h\_dv\_max} \leq \text{h\_supp\_lev}$$

$$\text{rear} = \text{Mrear for h\_dv\_max} \leq \text{h\_supp\_lev} \tag{7}$$

That is, when h_dv_max is smaller than h_supp_lev, a dynamic range dv_range (=front−rear) in the phase of the conversion video is equal to a dynamic range Mdv_range (=Mfront−Mrear) in the phase previously determined by the user.

In the distortion suppression processing for suppressing the dynamic range in a real machine, h_supp_lev is replaced with a unit of an estimated depth in order to reduce a load on a CPU. For convenience, however, description was made using a unit system of pixels.

Description is made of a distance scale conversion method.

In a two-lens stereoscopic display, a parallax W between corresponding points of a right eye image (an R image) and a left eye image (an L image) and a distance Yp from a screen actually viewed to a position where the images are merged together are in a non-linear relationship.

That is, when the R image and the L image which have a parallax W [mm] therebetween on the screen of the display are viewed from a position spaced a distance K [mm] apart from the screen, the distance Yp [mm] from the screen to the position where the images are merged together is expressed by the following equation (8):

$$Yp = KW/(W-2E) \tag{8}$$

In the foregoing equation (8), variables respectively represent the following values:

K: a distance [mm] from the screen of the display to a viewer

E: a length [mm] which is one-half the distance between the eyes

W: a parallax [mm] between the corresponding points of the left eye image and the right eye image on the screen of the display Yp: a distance [mm] from the screen to the position where the images are merged together When the foregoing equation (8) is shown graphically in FIG. 5, letting K=1000 mm and 2E=65 mm.

FIG. 5 shows that a spatial distortion cannot be prevented from occurring in images to be merged together only by linearly replacing a depth estimate with a unit of pixels. In a distance scale method, therefore, the depth estimate is converted into the unit of pixels in consideration of the spatial distortion.

The distance scale conversion method will be briefly described.

The width of one pixel on the display is taken as U [mm]. When it is assumed that there is a parallax W corresponding to α pixels between the corresponding points, the parallax W is expressed by the following equation (9):

$$W = \alpha U \tag{9}$$

By substituting the foregoing equation (9) in the foregoing equation (8), the relationship between the pixels and the position where the images are merged together is found, as expressed by the following equation (10):

$$Yp = K\alpha U/(\alpha U - 2E) \tag{10}$$

Furthermore, the foregoing equation (10) is deformed, to obtain the following equation (11):

$$\alpha = 2E \cdot Yp / \{(Yp-K)U\} \quad (11)$$

In complete distance scale conversion, when the maximum projection amount Ymax' from the screen and the maximum recession amount Ymin' from the screen are designated, if a depth estimate depth (having a value from 0 to 100) is determined, a corresponding depth Yp can be obtained by simple scale conversion expressed by the following equation (12):

$$Yp = Ymax' - Ymin') \times depth/100 \quad (12)$$

A parallax a corresponding to Yp is found by the foregoing equation (11). Consequently, the depth estimate can be converted into a unit of pixels in consideration of the spatial distortion.

In the complete distance scale conversion, when a 256-stage parallax conversion table W″ is used, the space between Ymax' and Ymin' is first divided into 256 equal divisions, and a corresponding parallax conversion table W″ [pixel] is found for each depth Yp on the basis of the foregoing equation (11).

In this case, W″ [255] is a parallax corresponding to Ymax', and W″ [0] is a parallax corresponding to Ymin'. If the depth estimate depth is determined, a corresponding parallax α is found from the following equation (13):

$$\alpha = W''[\text{lev}] \quad (13)$$

Here, lev indicates the number of stages on the parallax conversion table, and is expressed by the following equation (14):

$$\text{lev} = 255 \times depth/100 \quad (14)$$

Although description was made of the complete distance scale conversion method in the 2D/3D conversion, the method has two problems, described below:

(1) When the maximum projection amount Ymax' is increased until the depth Yp is saturated, the distortion of the conversion image itself (the distortions of the R image itself and the L image itself) is increased in a portion having a depth in the vicinity of Ymax'.

(2) When an attempt to enlarge a dynamic range in a depth reproduction space is made, there is no alternative but to reduce the maximum recession amount Ymin'. Accordingly, an area projected forward from the screen is extremely reduced.

In order to avoid the above-mentioned problem, the conversion must be carried out using only an area where there is some degree of proportionality between a depth and a parallax. However, this causes the complete distortion scale conversion to be approximately the same as pixel scale conversion. Therefore, it is no longer easy to say that the complete distance scale conversion is useful because complicated processing is performed.

Therefore, polygonal line distance scale conversion next introduced has been devised. In the polygonal line distance scale conversion, a projection amount ratio C [%] is introduced, to divide the space from Ymax' to 0 into 255*C/100 into equal divisions, and to divide the space from 0 to Ymin' into 255{(1−C)/100}} into equal divisions, thereby finding a parallax conversion table, as shown in FIG. 7.

That is, the projection amount ratio C is controlled, thereby making it possible to change a projection amount forward from the screen and suppress the distortion of the conversion image itself in a portion where the projection amount reaches its maximum. In the polygonal line distance scale conversion, an equation corresponding to the foregoing equation (12) is the following equation (15):

$$Yp = Ymax' \times \{depth - (100 - C)\}/C \text{ for } depth \geq (100 - C)$$

$$Yp = \{-Ymin' \times depth/(100-C)\} + Ymin' \text{ for } depth < C \quad (15)$$

Furthermore, an equation corresponding to the foregoing equation (14) representing the number of stages on the parallax conversion table W″ is the following equation (16):

$$\text{lev} = (255 - \text{Dlev}) \times \{depth - (100-C)\}/C + \text{Dlev for } depth \geq (100-C)$$

$$\text{lev} = \text{Dlev} \times depth/(100-C) \text{ for } depth < (100-C) \quad (16)$$

Here, Dlev is defined by the following equation (17), and represents the number of stages, on the parallax conversion table, corresponding to the screen:

$$\text{Dlev} = (100-C) \times 255/100 \quad (17)$$

The polygonal line distance scale conversion is so carried out that no spatial distortion occurs ahead of and behind the screen. Conversely speaking, a spatial distortion occurs on the screen. This is based on the hypothesis that the spatial distortion is most difficult to understand in the vicinity of the screen from the term "when a stereoscopic video is viewed, how the video is seen differs ahead of and behind a screen" obtained from a lot of viewers.

As values actually employed, Ymax', Ymin', and C are determined such that the inclination (the step width) of the depth parallax conversion table does not greatly differs ahead of and behind the screen.

Meanwhile, the above-mentioned distortion suppression processing using the linear operation is effective for the pixel scale conversion. However, it cannot be said that it is effective for the distance scale conversion. The reason for this is that the distance scale conversion has such properties that the parallax greatly differs ahead of and behind the screen even if the depth estimate is the same, for example "1" because the depth Yp and the parallax W [pixel] are non-linear. This tendency becomes significant in a large-screen display. In the polygonal line distance scale which is an improvement of the complete distance scale, the projection amount ratio C is introduced even in the sense of lessening the properties.

Even in the polygonal line distance scale capable of controlling the projection amount ratio C, however, the maximum value h_dv_max [pixel] of the phase difference between the adjacent areas cannot be completely suppressed within the distortion allowable range h_supp_lev [pixel] (the principle of suppressing a distortion in a pixel scale cannot be faithfully realized). In order to realize the principle of suppressing a distortion, distortion suppression processing must be performed after the distance scale conversion.

4. Simultaneous Use of MTD Method and CID Method

Generally, a human being perceives a feeling of distance at the time of stereoscopic view, for example, by the difference between dead angle portions (occlusion) of images respectively entering his or her right and left eyes, for example, caused by the difference between the positions of the right and left eyes. In terms of this, the feeling of distance or the like can be covered in the MTD method. On the other hand, a video which does not move or a video whose movement is complicated cannot be satisfactorily converted into a three-dimensional video. In the CID method, a parallax between right and left eye images can be freely changed. On the other hand, a human being cannot be shown a video as if its dead angle portions serving as a shadow of a subject were different depending on the parallax in his or her right and left eyes.

Therefore, it is considered that 2D/3D conversion is carried out simultaneously using the MTD method effective for a moving picture and the CID method capable of also converting a still picture. In this case, it is considered that a parallax obtained by the MTD method and a parallax obtained by the CID method are simply added together.

However, the parallax obtained by the MTD method and the parallax obtained by the CID method are individually controlled. Accordingly, the parallax produced by the conversion greatly depends on the presence or absence of the movement of an input video. That is, when the input video is a moving picture, a parallax obtained by the MTD method and a parallax obtained by the CID method are reflected on a conversion video. When it is a still video, however, there is no parallax obtained by the MTD method, and there is only a parallax obtained by the CID method.

Such a phenomenon that a stereoscopic effect of a conversion video greatly differs depending on an input video is inconvenient when a user adjusts a stereoscopic effect.

An object of the present invention is to provide a method of converting a two-dimensional video into a three-dimensional video, in which a stereoscopic effect of a conversion video can be prevented from greatly differing depending on an input video when the two-dimensional video is converted into the three-dimensional video simultaneously using the MTD method and the CID method.

Another object of the present invention is to provide a method of converting a two-dimensional video into a three-dimensional video, in which the distortion of a conversion image can be suppressed when a depth estimate is converted into a parallax using distance scale conversion.

DISCLOSURE OF INVENTION

[1] Description of device for converting two-dimensional video into three-dimensional video according to the present invention A device for converting a two-dimensional video into a three-dimensional video according to the present invention is characterized by comprising a field memory for storing for each field a two-dimensional video signal inputted from a video signal source; motion vector detection means for detecting for each area of an input video a motion vector corresponding to movement between fields of the inputted video signal; readout means for reading out, out of the video signals stored in the field memory, the video signal delayed from the inputted video signal by a delay found from the motion vector for each area detected by the motion vector detection means from the field memory; switching means for outputting one of the inputted video signal and the video signal read out of the field memory and the other video signal, respectively, as a left eye video signal and a right eye video signal on the basis of the direction of a horizontal component of the motion vector for each area detected by the motion vector detection means; feature extraction means for extracting for each area of the input video a video feature from the inputted video signal; parallax calculation means for calculating, on the basis of the image feature for each area of the input video extracted by the feature extraction means, a depth for the area and calculating a parallax for the area from the calculated depth for the area; parallax correction means for correcting the parallax for each area calculated by the parallax calculation means depending on the magnitude of the motion vector for the area detected by the motion vector detection means; and phase control means for correcting, on the basis of the parallax for each area corrected by the parallax correction means, phases for the area of the right eye video and the left eye video outputted by the switching means, and outputting the videos as a stereoscopic video signal.

Used as the parallax correction means is one comprising means for calculating for each area a difference parallax obtained by subtracting from the parallax for the area calculated by the parallax calculation means the parallax dependent on the magnitude of the motion vector in the corresponding area, and means for calculating a difference parallax for each area by changing a dynamic range such that the maximum value of the difference in the difference parallax between the adjacent areas is within a predetermined range.

It is preferable that there is provided means for reducing, when the sum of the difference parallax for each area obtained by the parallax correction means and the parallax dependent on the magnitude of the motion vector in the corresponding area exceeds a predetermined range, a delay by an amount corresponding to the excess parallax.

[2] Description of first method of converting two-dimensional video into three-dimensional video according to the present invention A first method of converting a two-dimensional video into a three-dimensional video according to the present invention is characterized by comprising a first step of storing for each field a two-dimensional video signal inputted from a video signal source in a field memory; a second step of detecting for each area of an input video a motion vector corresponding to movement between fields of the inputted video signal; a third step of reading out, out of the video signals stored in the field memory, a video signal delayed from the inputted video signal by a delay found from the motion vector for each area detected at the second step from the field memory; a fourth step of outputting one of the inputted video signal and the video signal read out of the field memory and the other video signal, respectively, as a left eye video signal and a right eye video signal on the basis of the direction of a horizontal component of the motion vector for each area detected at the second step; a fifth step of extracting for each area of the input video a video feature from the inputted video signal; a sixth step of calculating, on the basis of the image feature for each area of the input video extracted at the fifth step, a depth for the area and calculating a parallax for the area from the calculated depth for the area; a seventh step of correcting the parallax for each area calculated at the sixth step depending on the magnitude of the motion vector for the area detected at the second step; and an eighth step of correcting, on the basis of the parallax for each area corrected at the seventh step, phases for the area of the right eye video and the left eye video outputted at the fourth step, and outputting the videos as a stereoscopic video signal.

Used as the seventh step is one comprising the steps of calculating for each area a difference parallax obtained by subtracting from the parallax for the area calculated at the sixth step the parallax dependent on the magnitude of the motion vector in the corresponding area, and calculating a difference parallax for each area by changing a dynamic range such that the maximum value of the difference in the difference parallax between the adjacent areas is within a predetermined range.

It is preferable that the method comprises the step of reducing, when the sum of the difference parallax for each area obtained at the seventh step and the parallax dependent on the magnitude of the motion vector in the corresponding area exceeds a predetermined range, a delay by an amount corresponding to the excess parallax.

[3] Description of second method of converting two-dimensional video into three-dimensional video according to the present invention A second method of converting a two-dimensional video into a three-dimensional video according to the present invention is characterized by comprising a first step of extracting an image feature related to the long or short distance of a video from each of a plurality of parallax calculation areas set within one screen on the basis of a two-dimensional video signal, and producing a depth estimate for the parallax calculation area on the basis of the extracted image feature; a second step of subjecting each of the depth estimates to distance scale conversion using a dynamic range defined by a predetermined maximum projection amount and a predetermined maximum recession amount, to find a tentative target phase for each of the parallax calculation areas; a third step of finding the maximum value of a phase difference between the adjacent parallax calculation areas on the basis of the tentative target phase for each of the parallax calculation areas; a fourth step of judging whether or not the maximum value of the phase difference between the adjacent parallax calculation areas is within a predetermined distortion allowable range; and a fifth step of searching, when the maximum value of the phase difference between the adjacent parallax calculation areas is outside the predetermined distortion allowable range, for such a dynamic range that the phase difference between the parallax calculation areas is within the distortion allowable range, subjecting each of the depth estimates to distance scale conversion using the dynamic range searched for, and finding a tentative target phase for each of the parallax calculation areas, to proceed to the third step.

Here, the distance scale conversion means a method of converting a depth estimate into a unit of pixels (a parallax) in consideration of a portion where images are merged together. Contrary to this, a method of linearly converting a depth estimate into a unit of pixels (a parallax) is referred to as pixel scale conversion.

At the fifth step, the dynamic range searched for may be corrected such that the ratio of the maximum projection amount to the maximum recession amount, which are defined by the dynamic range, is a predetermined ratio, and each of the depth estimates is then subjected to distance scale conversion using the corrected dynamic range.

BRIEF DESCRIPTION OF DRAWINGS

FIG. 4 is a schematic view for explaining dynamic range suppression processing in the conventional CID method.

BEST MODE FOR CARRYING OUT THE INVENTION

[1] Description of First Embodiment

Referring now to FIGS. 9 to 12, a first embodiment of the present invention will be described.

Figure 1:
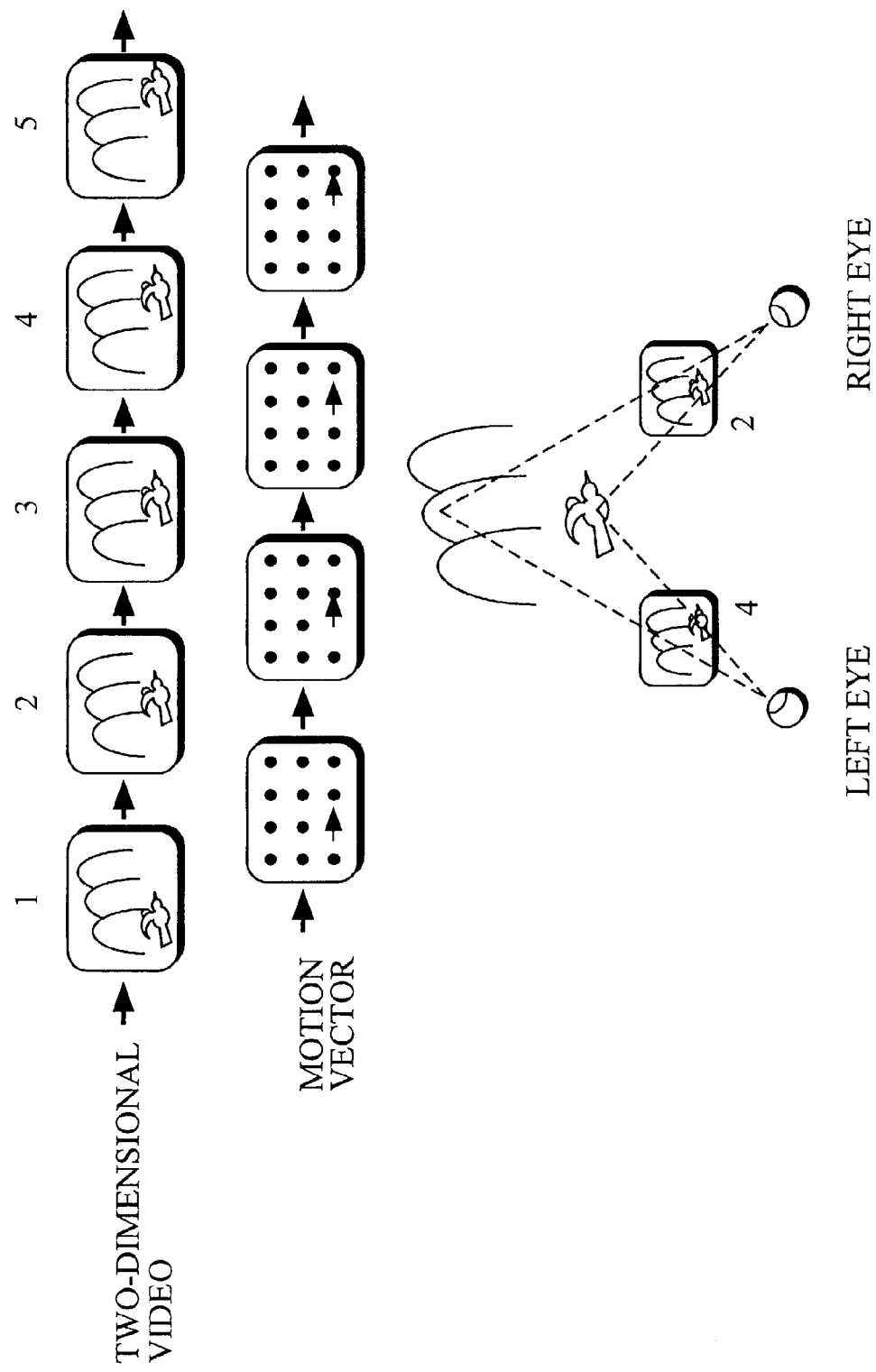
FIG. 1 is a schematic view for explaining the conventional MTD method.
Figure 2:
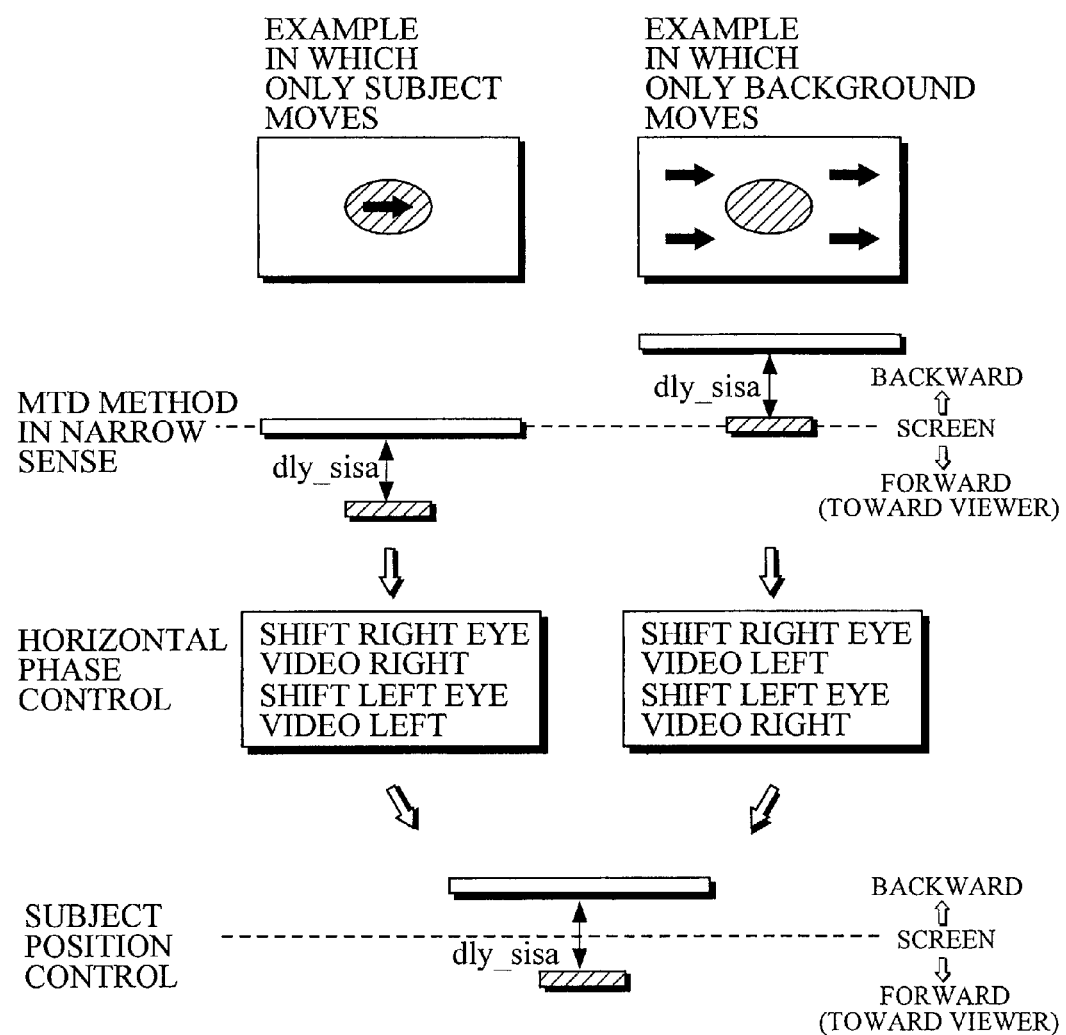
FIG. 2 is a schematic view for explaining subject position control.
Figure 3:
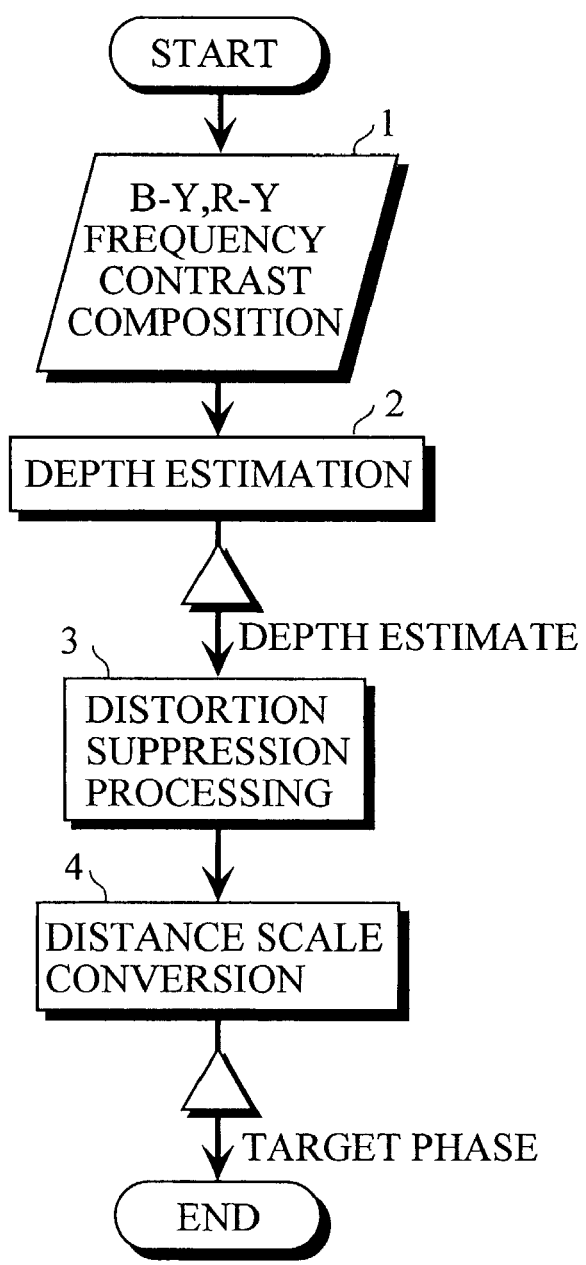
FIG. 3 is a flow chart showing the procedure for control processing in the conventional CID method.
Figure 5:
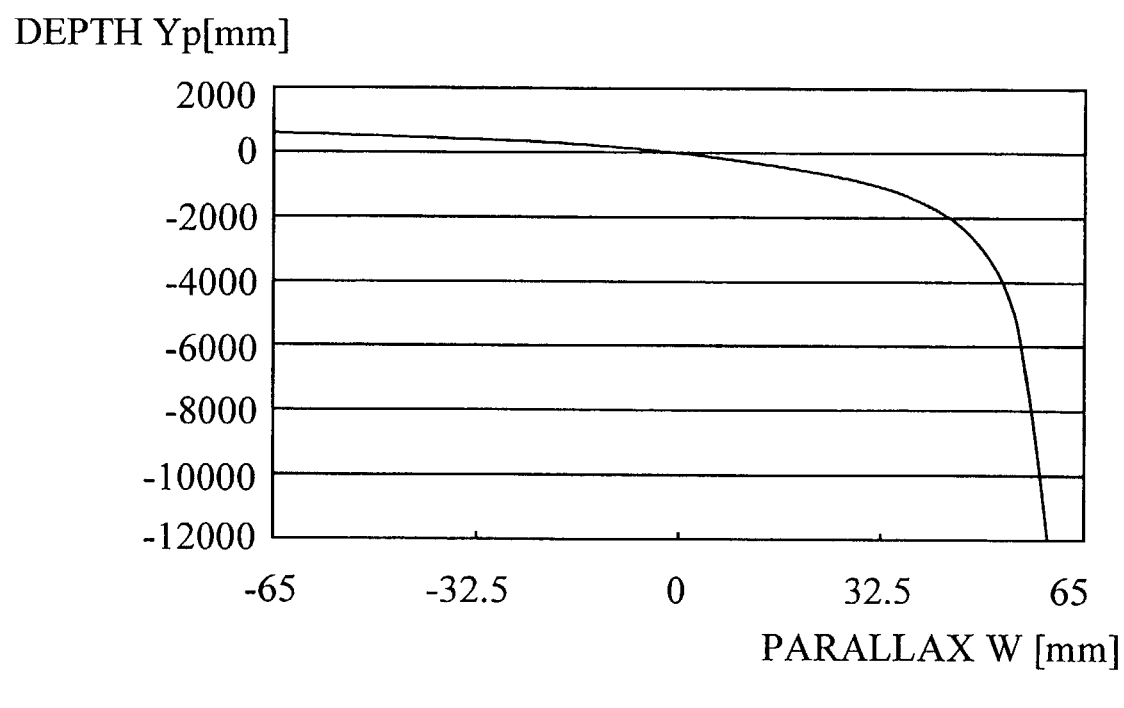
FIG. 5 is a graph showing the relationship between a parallax W between images and a portion where the images are merged together Vp.
Figure 6:
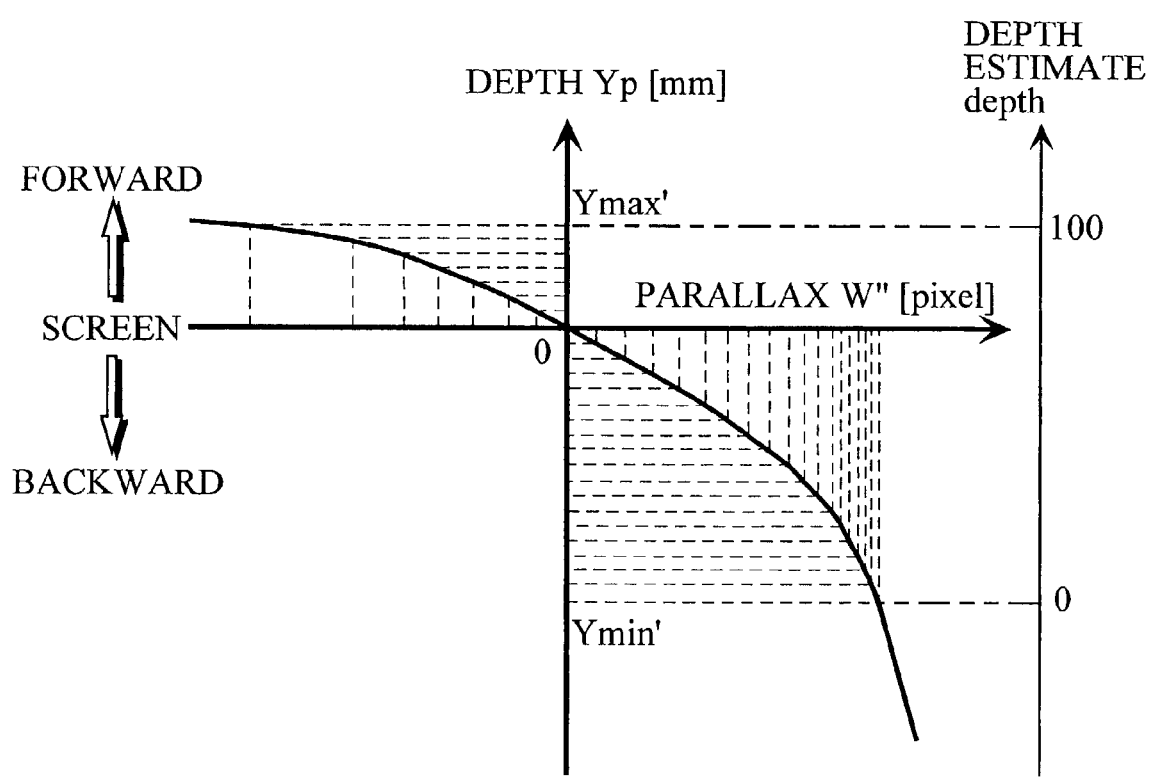
FIG. 6 is a graph for explaining complete distance scale conversion.
Figure 7:
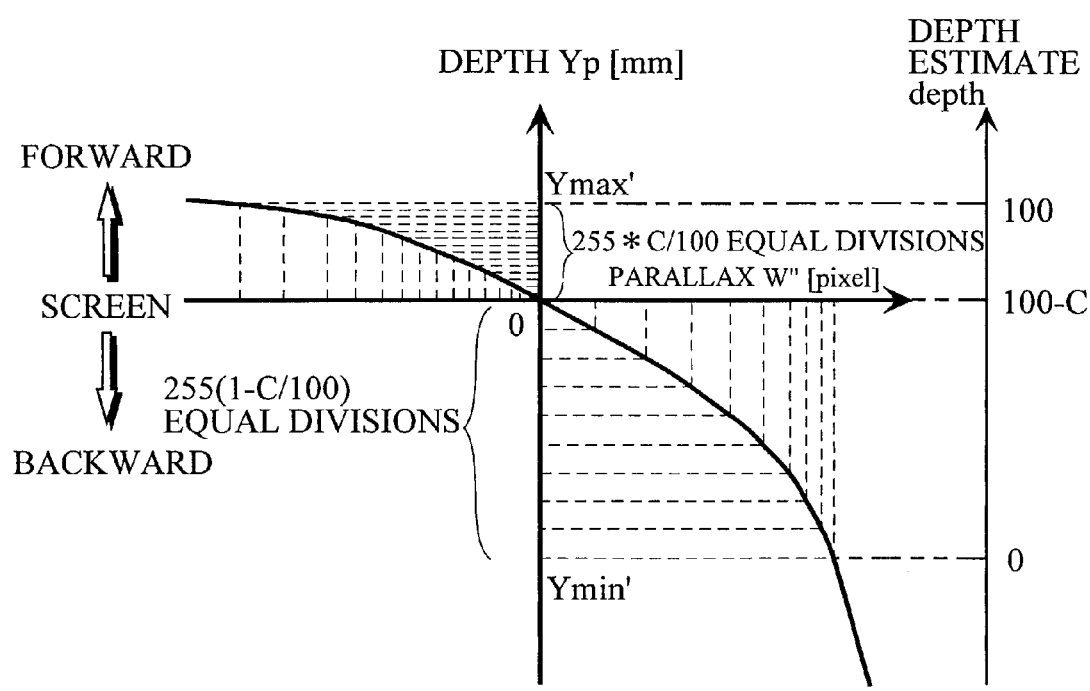
FIG. 7 is a graph for explaining polygonal line distance scale conversion.
Figure 8:
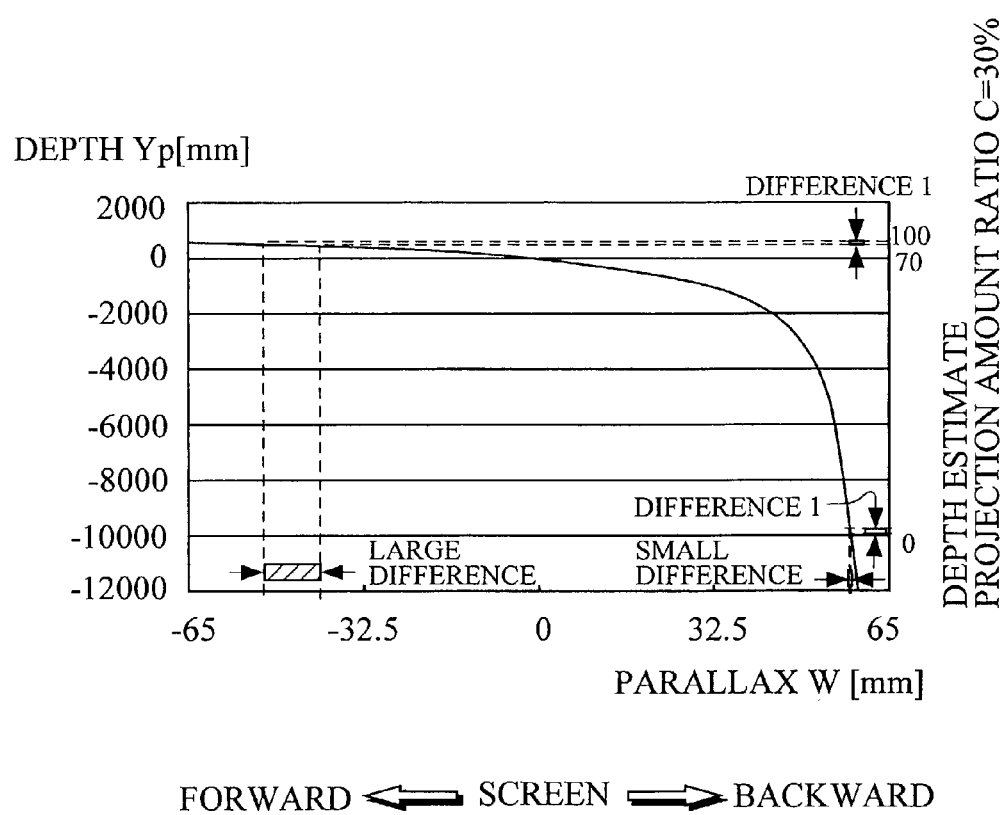
FIG. 8 is a graph for showing such properties that a parallax W [pixel] greatly differs ahead of and behind a screen even if a depth estimate is the same, for example, "1" because a depth Yp and the parallax are non-linear.
Figure 9:
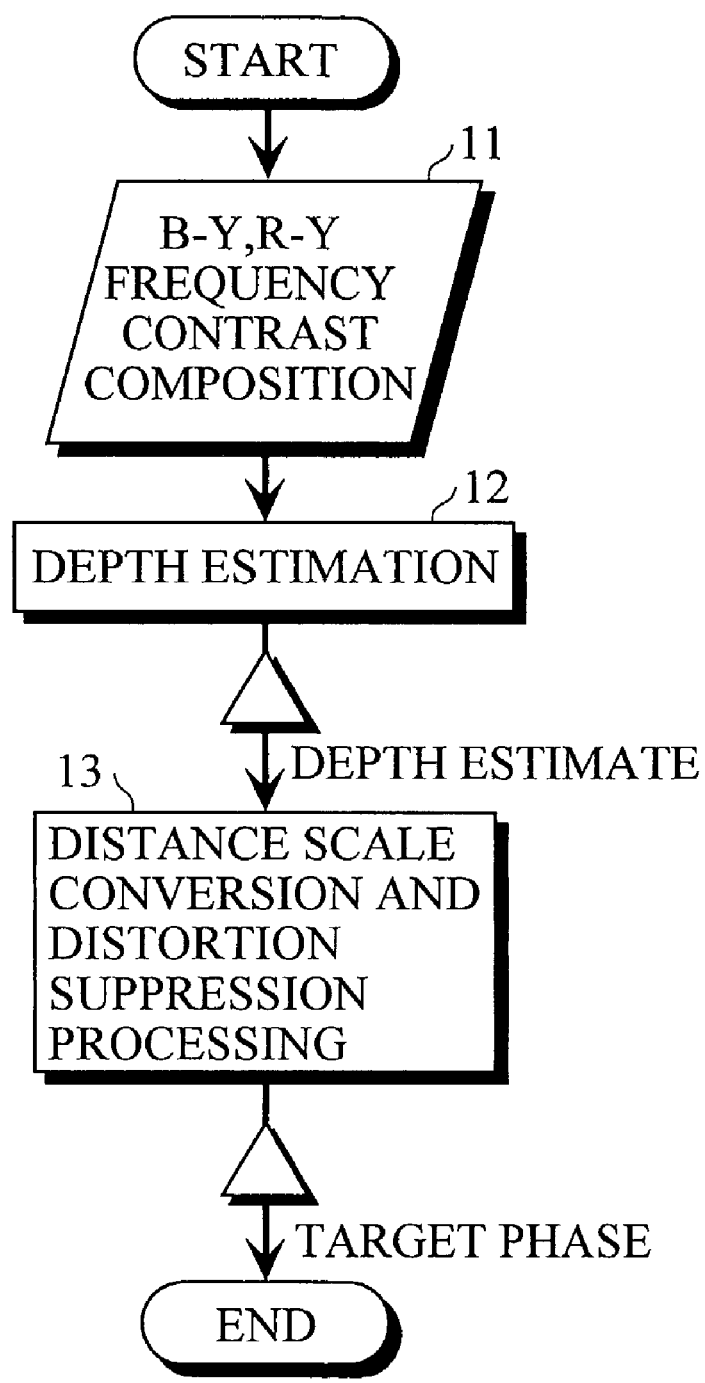
FIG. 9 is a flow chart showing the procedure for control in the CID method according to a first embodiment of the present invention.

FIG. 9 shows the procedure for control in the CID method according to the first embodiment of the present invention.

First, one screen is divided into a plurality of areas, and information related to a high frequency and a contrast of luminance, and a chrominance (B-Y, R-Y) component are obtained from each of the areas (step 11). A depth estimate for each of the areas, which has been estimated from the information and a composition, is found (step 12). The found depth estimate is subjected to distance scale conversion and distortion suppression processing, thereby obtaining a target phase (step 13).

Figure 10:
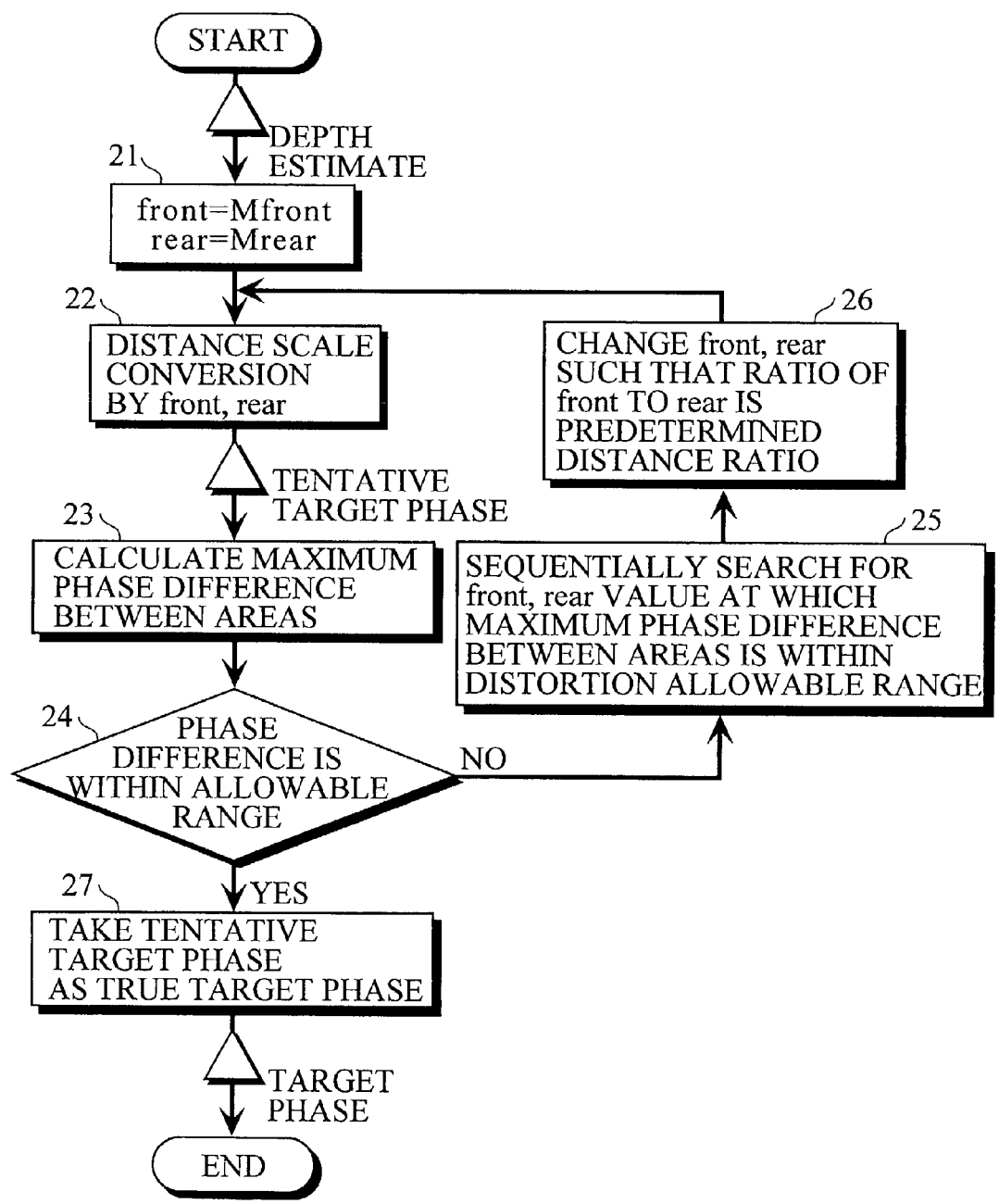
FIG. 10 is a flow chart showing distance scale conversion and distortion suppression processing at the step 13 shown in FIG. 9.

FIG. 10 shows the details of the distance scale conversion and distortion suppression processing at the step 13 shown in FIG. 9.

First, the depth estimate is subjected to the distance scale conversion in a dynamic range defined by Mfront and Mrear, to obtain a tentative target phase (steps 21 and 22) The maximum value h_dv_max [pixel] of a phase difference between the adjacent areas is calculated on the basis of the obtained tentative target phase (step 23).

It is judged whether or not the maximum value h_dv_max [pixel] of the phase difference between the adjacent areas is within a distortion allowable range h_supp_lev [pixel] (step 24). When it is within the allowable range, the tentative target phase is taken as a true target phase (step 27).

When the maximum value of the phase difference between the adjacent areas is outside the distortion allowable range, a dynamic range defined by Mfront and Mrear is gradually reduced until the maximum value of the phase difference is not more than h_supp_lev, thereby obtaining the most suitable values of front and rear (step 25). For convenience, the processing at the step 25 shall be referred to as sequential search processing. The details of the sequential search processing will be described later.

After front and rear are changed such that the distance ratio of front to rear, which are found by the sequential search processing, is a distance ratio designated by a user (step 26), the program is returned to the step 22. At the step 22, distance scale conversion is further carried out.

The processing at the steps 22, 23, 24, 25, and 26 is repeated until the maximum value h_dv_max [pixel] of the phase difference between the adjacent areas is within the distortion allowable range h_supp_lev [pixel], to obtain a final target phase. The distance scale conversion is carried out every time the dynamic range is changed in order to accurately realize such a distance scale principle that a viewer is made to perceive a stereoscopic video conforming to the depth estimate independently of a spatial distortion in a stereoscopic display.

The sequential search processing will be then described.

In a distance scale where a depth estimate and a phase are non-linear, the dynamic range defined by the values of front and rear is determined by the sequential search processing in order to increase the dynamic range.

In the sequential search processing, a parallax can be also calculated using a depth parallax conversion equation (an equation 15). However, calculation using a parallax conversion table W" previously calculated in the following manner is more efficient. This method will be described, taking a depth estimate at a screen level in a case where it is standardized between 0 and 100 as surface_depth (=100−C).

When the numbers of stages, on the parallax conversion table W", corresponding to the front value and the rear value are respectively taken as Max_lev (=255~Dlev) and Min_lev (=Dlev~0), the number of stages lev, on the parallax conversion table, corresponding to a certain depth estimate v_depth is expressed by the following equation (18):

$$lev=(v\_depth-surface\_depth)*(Max\_lev-Dlev)/(100-surface\_depth)+Dlev \text{ for } v\_depth>surface\_depth$$

$$lev=(v\_depth-Min\_lev)*(Dlev-0)/(surface\_depth-Min\_lev) \text{ for } v\_depth<surface\_depth$$

$$lev=Dlev \text{ for } v\_depth=surface\_depth \quad (18)$$

A phase phase corresponding to lev can be expressed by the following equation (19) because it is uniquely found by the parallax conversion table W".

$$phase=W''(lev) \quad (19)$$

In the sequential search processing, the front value and the rear value at which the maximum phase difference between the adjacent areas is not more than h_supp_lev can be found out by gradually changing Max_lev and Min_lev.

As apparent from the foregoing equation (18), in the sequential search processing, methods of searching for the most suitable values of front and rear in accordance with the relationship between phases in the adjacent two areas between which there is a maximum phase difference are of the following three types:

First case: when both the areas respectively have phases ahead of the screen, the front value is brought near to zero (Max_lev is brought near to Dlev).

Second case: when both the areas respectively have phases behind the screen, the rear value is brought near to zero (Min_lev is brought near to Dlev).

Third case: when one of the areas has a phase ahead of the screen, and the other area has a phase behind the screen, both the front value and the rear value are brought near to zero (Max_lev and Min_lev are brought near to Dlev).

In the third case, Max_lev and Min_lev are brought near to Dlev so as to hold the distance ratio previously designated by the user, that is, so as to hold a relationship expressed by the following equation (20) at the time of the sequential search processing:

$$(255-Dlev): Dlev=(Max\_lev-Dlev): (Dlev-Min\_lev) \quad (20)$$

The foregoing equation (20) is synonymous with the processing at the step 26 shown in FIG. 10. In the first case and the second case, processing for changing the distance ratio is performed not at the time of the sequential search processing but at the step 26 shown in FIG. 10 in order to reduce the amount of operation.

Figure 11:
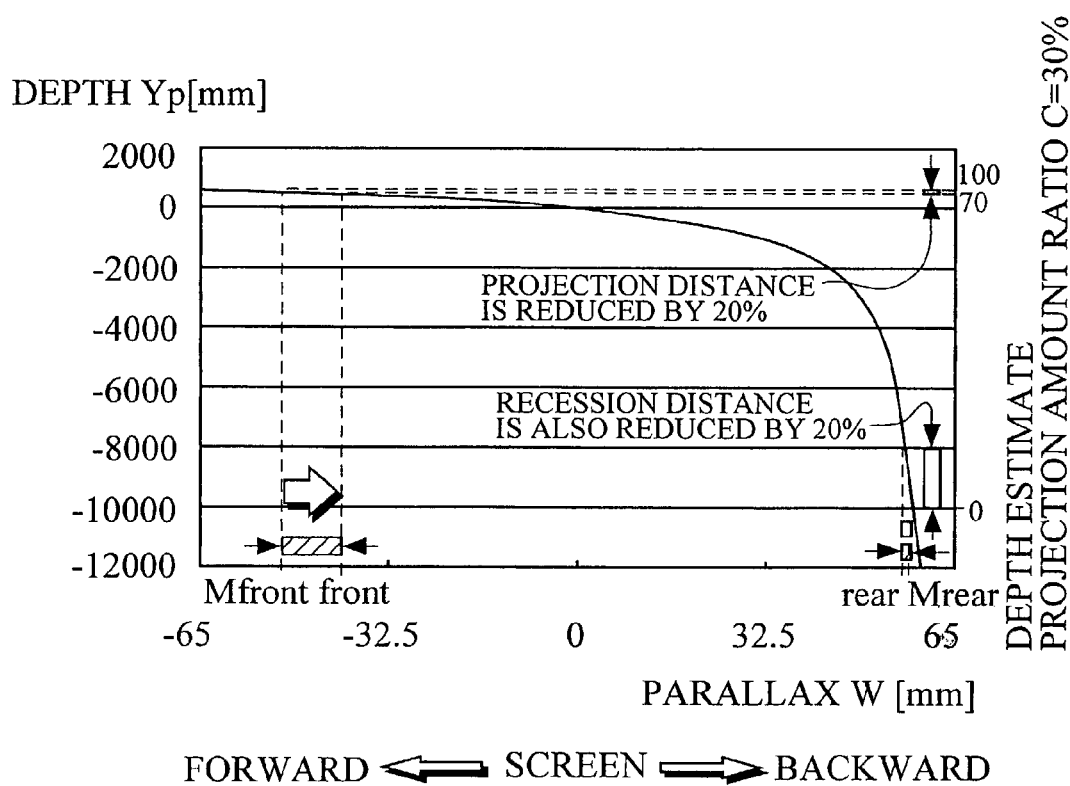
FIG. 11 is a graph showing that a depth relationship ahead of and behind a screen even if a dynamic range is changed by introducing a method of maintaining a distance ratio.

A method of maintaining the distance ratio is introduced in the distance scale in order to hold a depth relationship ahead of and behind the screen even if the dynamic range is changed. Specifically, as shown in FIG. 11, when a distance ahead of the screen is reduced by 20% in the first case, a distance behind the screen is also reduced by 20%, to maintain the relationship ahead of and behind the screen.

When the distance ratio is maintained on the parallax conversion table, a projection amount ratio C can be also maintained. Consequently, a conversion video having no uncomfortable feeling can be presented to a viewer who tends to recognize a space as a relatively depth.

However, there is a case where the video is better when the overall dynamic range is widened depending on the characteristics of the eyes of the viewer. In such a case, not the distance ratio but the amount ratio is only maintained in the first case and the second case.

Figure 12:
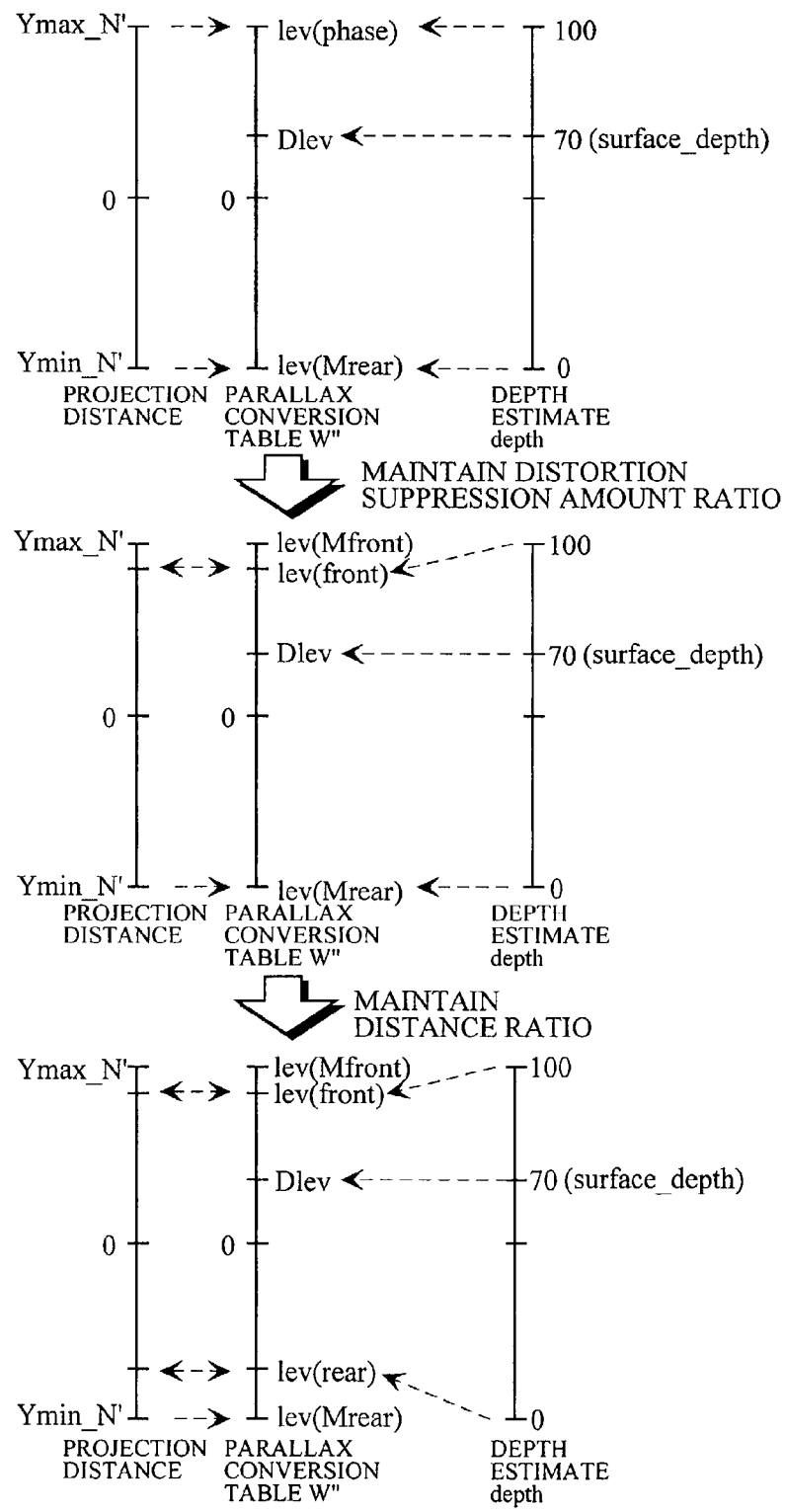
FIG. 12 is a schematic view showing a case where polygonal line distance scale conversion for only maintaining an amount ratio is carried out and a case where processing for maintaining a distance ratio is performed.

Fit. 12 illustrates a case where polygonal line distance scale conversion for only maintaining the amount ratio is carried out and a case where processing for maintaining the distance ratio is further performed. In the polygonal line distance scale conversion for only maintaining the amount ratio, a correspondence between a depth estimate on the screen and the parallax conversion table is established by carrying out separate range conversions with the depth estimate as its boundary. In a case where the distance ratio is maintained, the depth estimate and the parallax conversion table can correspond to each other by one range conversion. A function lev (phase) in FIG. 12 represents an inverse function of the foregoing equation (19), and means that the number of stages on the parallax conversion table is found from a phase phase [pixel].

[2] Description of Second Embodiment

Figure 13:
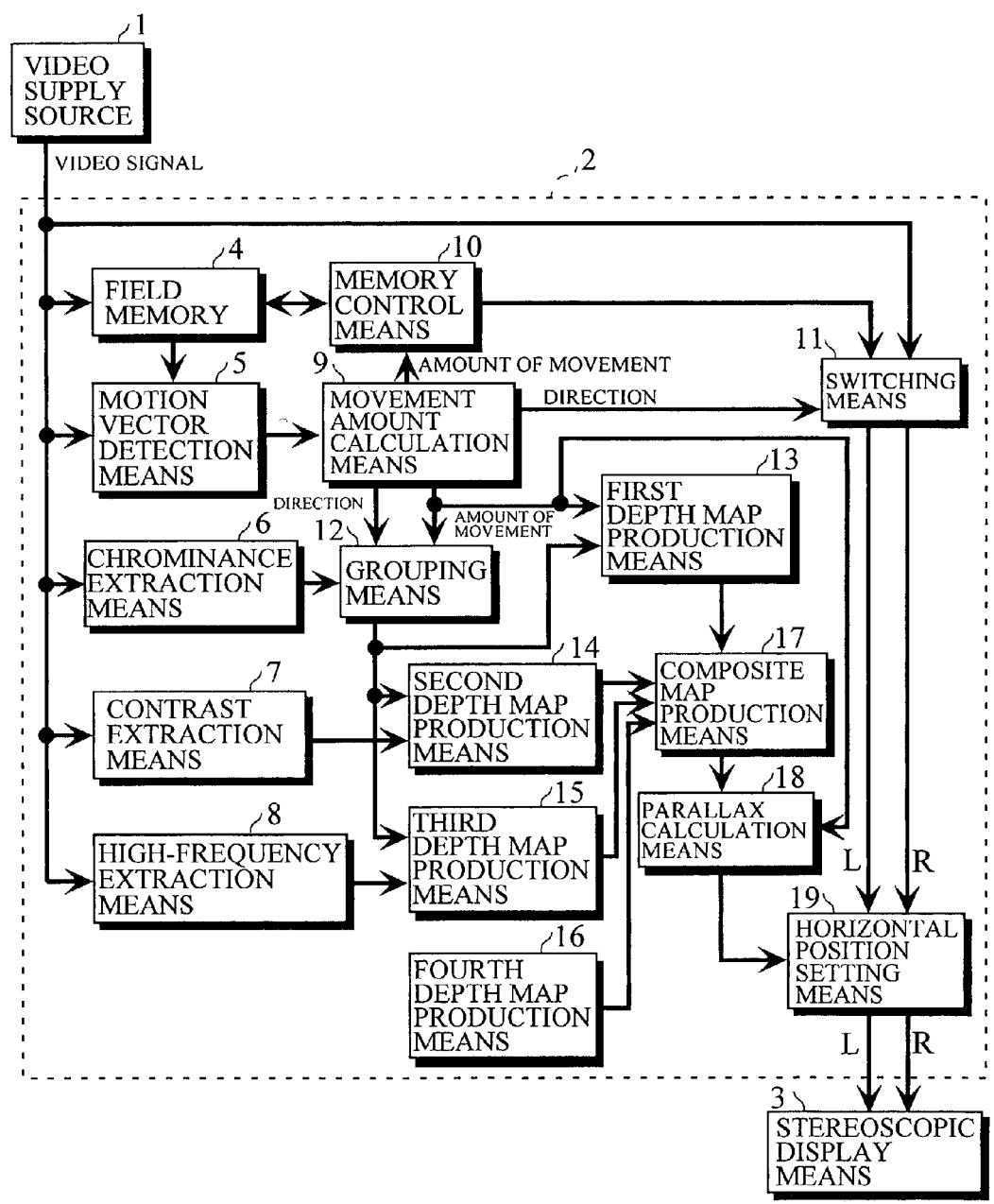
FIG. 13 is a diagram showing the schematic configuration of a 2D/3D converting device according to a second embodiment.
Figure 14:
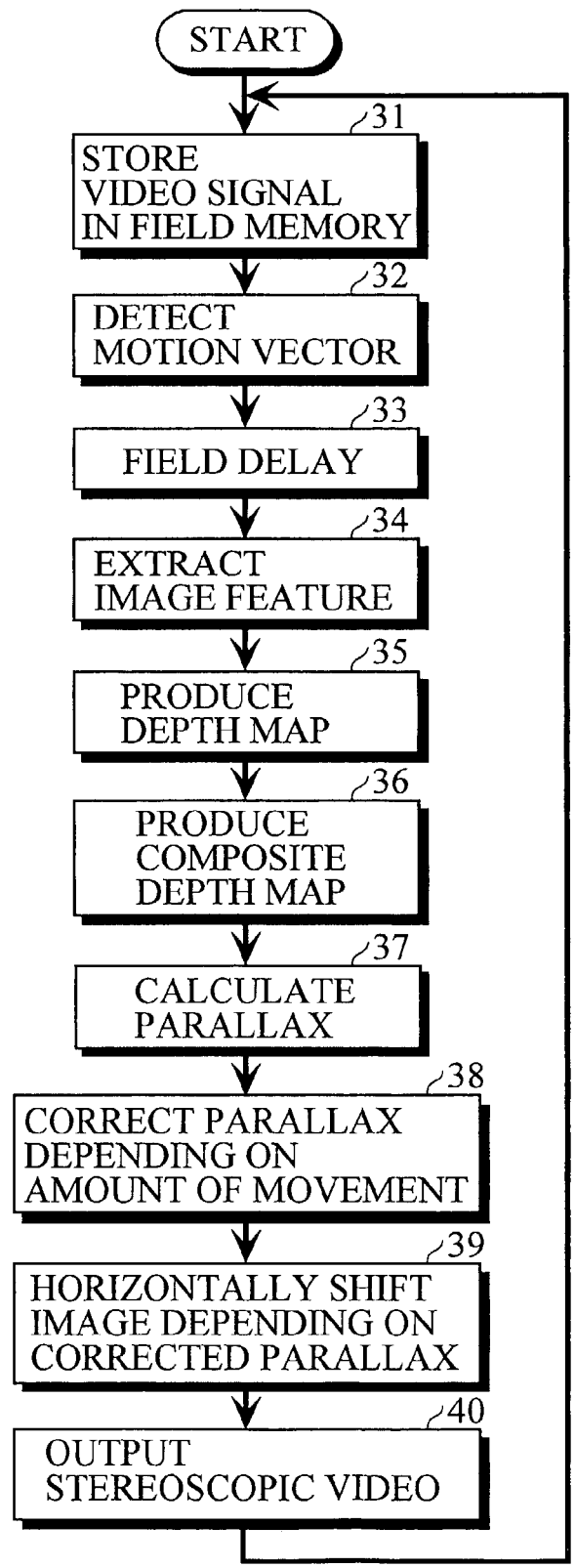
FIG. 14 is a flow chart showing the operations of the 2D/3D converting device shown in FIG. 1.

Referring now to FIGS. 13 and 14, a second embodiment of the present invention will be described.

In FIG. 13, reference numeral 1 denotes a video supply source serving as video signal supply means such as a VTR (Video Table Recorder), a CD-ROM (Compact Disc Read-Only Memory), or TV broadcasting, reference numeral 2 denotes a 2D/3D converting device for converting a two-dimensional video signal supplied from the video supply source 1 into a three-dimensional video signal, that is, a left eye video signal L and a right eye video signal R, and reference numeral 3 denotes stereoscopic display means using an image splitter system or the like for displaying the three-dimensional video signal outputted from the 2D/3D converting device 2.

Description is made of the configuration of the 2D/3D converting device 2.

Reference numeral 4 denotes a field memory storing as a video the video signal supplied from the video supply source 1 for each field, and reference numeral 5 denotes motion vector detection means for detecting a motion vector from the video signal supplied from the video supply source 1.

Reference numeral 6 denotes chrominance extraction means for extracting a chrominance component from the video supplied from the video supply source 1, reference numeral 7 denotes contrast extraction means for extracting a contrast from the video supplied from the video supply source 1, and reference numeral 8 denotes high-frequency component extraction means for extracting a high-frequency component from the video supplied from the video signal source 1. The chrominance extraction means 6, the contrast extraction means 7, and the high-frequency component extraction means 8 constitute image feature extraction means.

Reference numeral 9 denotes movement amount calculation means for finding from the motion vector detected by the motion vector detection means the direction of movement and the amount of movement (the magnitude of the motion vector), and outputting the direction and amount of movement, reference numeral 10 denotes memory control means for reading out from the field memory 4 an image (a delayed image) delayed by the number of fields corresponding to the amount of movement outputted from the movement amount calculation means 9 using the current image as a basis, and reference numeral 11 denotes switching means for switching as to which of the reference image (the current image) and the delayed image should be outputted as a left eye video signal L or a right eye video signal R on the basis of the direction of movement outputted from the movement amount calculation means 9.

Reference numeral 12 denotes grouping means for grouping areas by portions which can be judged to be the same object such as a subject or a background depending on the chrominance component extracted by the chrominance extraction means 6 and the amount and direction of movement calculated by the movement amount calculation means 9 from the video supplied from the video supply source 1, and outputting information related to the grouping, and reference numeral 13 denotes first depth map production means for calculating depth information from the amount of movement calculated by the movement amount calculation means 9 and the grouping information obtained by the grouping means 12, to produce a depth map.

Reference numeral 14 denotes second depth map production means for calculating depth information from information related to the contrast extracted by the contrast extraction means 7 for the areas obtained by the grouping in the grouping means 12, to produce a depth map, reference numeral 15 denotes third depth map production means for calculating depth information from information related to the high-frequency component extracted by the high-frequency component extraction means 8 for the areas obtained by the grouping in the grouping means 12, to produce a depth map, and reference numeral 16 denotes fourth depth map production means for calculating depth information from information related to a composition previously set and information related to the areas obtained by the grouping in the grouping means 12, to produce a depth map.

Reference numeral 17 denotes composite map production means for weighting, adding, and synthesizing the depth maps produced by the depth map production means 13, 14, 15, and 16, to produce a composite map, reference numeral 18 denotes parallax calculation means for calculating a parallax for each parallax calculation area previously set from the composite map produced by the composite map production means 17, and reference numeral 19 denotes horizontal position setting means for shifting left and right eye images outputted from the switching means 11 in the horizontal direction in units of pixels, for example, to synthesize the images on the basis of the parallax for each parallax calculation area calculated by the parallax calculation means 18.

The parallax calculation means 18 considers an amount of frame delay on the basis of the amount of movement calculated by the movement amount calculation means 9, thereby correcting, that is, reducing the parallax outputted to the horizontal position setting means 19 depending on the amount of movement.

FIG. 14 shows the operations of the 2D/3D converting device 2.

A video signal supplied from the video supply source 1 is stored in the field memory 4 for each field (step 31). A motion vector is detected from the two-dimensional video signal supplied from the video supply source 1 by the motion vector detection means 5, and the amount of movement and the direction of movement of the motion vector are calculated by the movement amount calculation means 9 (step 32). Specifically, the motion vector detection means 5 compares an image in the current field with an image which is one field preceding the current field, to extract as a motion vector the amount of movement and the direction of movement of a subject in the image.

An image (a delayed image) delayed by a predetermined number of fields from the two-dimensional video signal (the reference image) from the video supply source 1 is then read out of the field memory 4 and is fed to the switching means 11 depending on the amount of movement of the motion vector detected at the step 32 (step 33). The switching means 11 outputs one of the reference image and the delayed image as a left eye video signal L and outputs the other image as a right eye video signal R on the basis of the direction of movement of the motion vector detected at the step 32.

The operations at the foregoing steps 31 to 33 correspond to operations in the MTD method.

Image features are then extracted on the basis of the two-dimensional video signal from the video supply source 1 (step 34). An image area corresponding to one field is divided into a plurality of areas, so that a plurality of image feature detection areas are set within the image area corresponding to one field. The chrominance extraction means 6 extracts chrominance information for each of the image feature detection areas. The contrast extraction means 7 extracts a contrast for each of the image feature detection areas. The high-frequency extraction means 8 extracts a high-frequency component for each of the image feature detection areas. Further, the grouping means 12 groups the areas in the image on the basis of the chrominance information for each of the image feature detection areas extracted by the chrominance extraction means 6 and the amount of movement detected at the step 32 in order to use the areas for judging a subject, a background, or the like.

A depth map is then produced (step 35). That is, the first depth map production means 13 produces a first depth map on the basis of the amount of movement of the motion vector calculated by the movement amount calculation means 9 and the grouping information obtained by the grouping means 12.

The second depth map production means 14 produces a second depth map on the basis of the contrast for each of the image feature detection areas extracted by the contrast extraction means 7 and the grouping information obtained by the grouping means 12. The third depth map production means 15 produces a third depth map on the basis of the high-frequency component for each of the image feature detection areas extracted by the high-frequency extraction means 8 and the grouping information obtained by the grouping means 12.

Furthermore, the fourth depth map production means 16 produces a fourth depth map on the basis of a composition on a screen previously set (for example, such a composition that if the screen is mainly composed of a landscape, a lower portion of the screen is the ground, an upper portion of the screen is the sky, and the center of the screen is a subject) and the grouping information obtained by the grouping means 12.

A composite depth map is then produced (step 36). That is, the composite map production means 17 weights and adds the first to fourth depth maps produced by the first to fourth depth map production means 13, 14, 15, and 16, to produce the composite depth map.

A parallax is then calculated (step 37). That is, the parallax calculation means 18 calculates a parallax between a left eye image and a right eye image for each parallax calculation area previously determined on the basis of the composite depth map produced by the composite map production means 17.

The foregoing steps 34 and 37 correspond to operations in the CID method.

The parallax is then corrected (step 38). That is, the parallax calculation means 18 corrects the parallax for each of the parallax calculation areas calculated at the step 37 depending on the amount of movement of the motion vector calculated by the movement amount calculation means 9. Specifically, the parallax calculated at the step 37 is reduced by a parallax corresponding to the delay of the delayed image from the reference image.

The right eye image L and the left eye image R are then horizontally shifted depending on the parallax after the correction (step 39). That is, the horizontal position setting means 19 horizontally shifts the left eye image L and the right eye image R outputted from the switching means 11 for each pixel, for example, on the basis of the parallax corrected at the step 38.

The left eye image L and the right eye image R which have been horizontally shifted by the horizontal position setting means 19 are displayed by the three-dimensional display means 3 (step 40).

[3] Description of Third Embodiment

Figure 15:
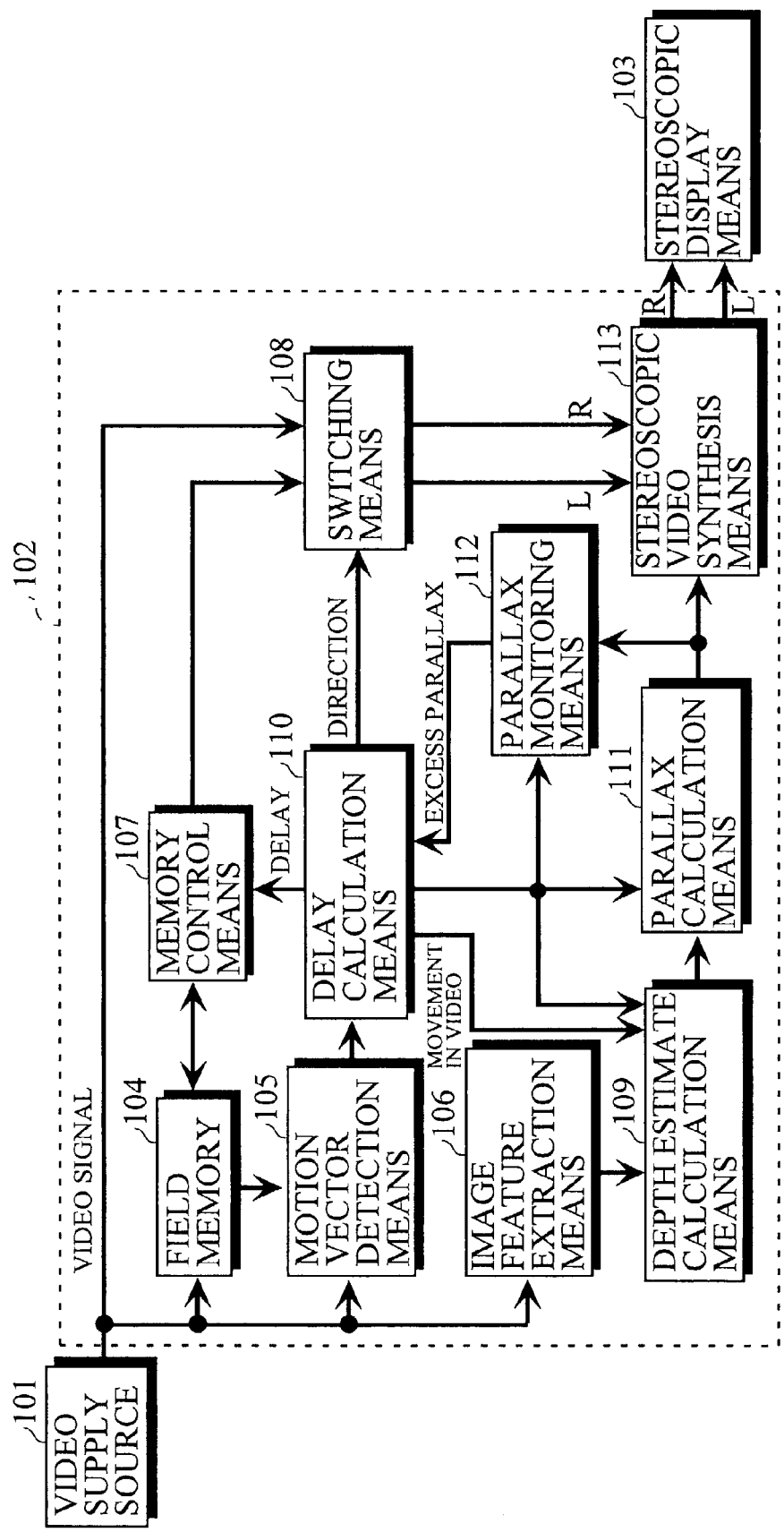
FIG. 15 is a diagram showing the schematic configuration of a 2D/3D converting device according to a second embodiment.
Figure 23:
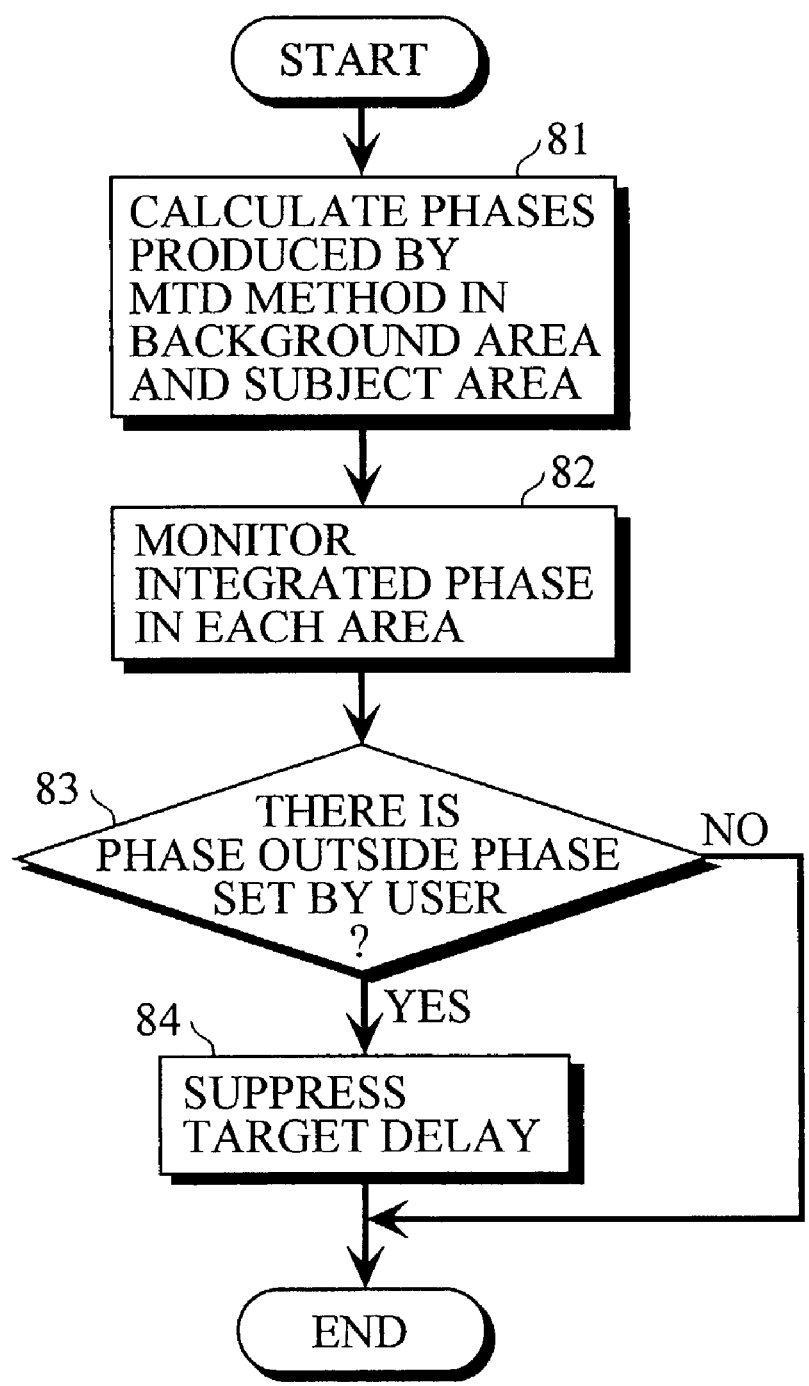
FIG. 23 is a flow chart showing the procedure for delay suppression processing.

Referring now to FIGS. 15 and 23, a third embodiment of the present invention will be described.

FIG. 15 illustrates the configuration of a device for converting a two-dimensional video into a three-dimensional video (a 2D/3D converting device).

In FIG. 15, reference numeral 101 denotes a video supply source serving as video signal supply means such as a VTR, a CD-ROM, or TV broadcasting, reference numeral 102 denotes a 2D/3D converting device for converting the two-dimensional video signal supplied from the video supply source 1 into a three-dimensional video signal, that is, a left eye video signal L and a right eye video signal R, and reference numeral 103 denotes stereoscopic display means using an image splitter system or the like for displaying a three-dimensional video signal outputted from the 2D/3D converting device 102.

Description is made of the configuration of the 2D/3D converting device 102.

Reference numeral 104 denotes a field memory storing the video signal from the video supply source 101 for each field, and reference numeral 105 denotes motion vector detection means for detecting a motion vector from the video signal supplied from the video supply source 101.

Reference numeral 106 denotes image feature extraction means for extracting for each area image features such as a chrominance component, a contrast, and a high-frequency component from a video supplied from the video supply source 101.

Reference numeral 110 denotes delay calculation means for calculating a delay from the motion vector detected by the motion vector detection means 105. Reference numeral 107 denotes memory control means for reading out from the field memory 104 an image (a delayed image) which is delayed by the number of fields corresponding to the delay calculated by the delay calculation means 110 using the current input image as a basis. Reference numeral 108 denotes switching means for switching as to which of the input image and the delayed image should be taken as a left eye video signal L or a right eye video signal R on the basis of the direction of movement outputted from the delay calculation means 110.

Reference numeral 109 denotes depth estimate calculation means for calculating, on the basis of the image features for each area extracted by the image feature extraction means 106, a depth estimate for the area. Reference numeral 111 denotes parallax calculation means for calculating, on the basis of the depth estimate for each area calculated by the depth estimate calculation means 109, a parallax (a phase) produced by the CID method for the area, and correcting, on the basis of a parallax produced by the MTD method which is outputted from the delay calculation means 110, the parallax produced by the CID method, to calculate an integrated parallax (an integrated phase).

Reference numeral 113 denotes stereoscopic video synthesis means for shifting respective areas (for example, pixel units) in right and left eye images outputted from the switching means 108 in the horizontal direction and synthesizing the areas on the basis of the integrated parallax calculated by the parallax calculation means 111.

Reference numeral 112 denotes parallax monitoring means for controlling a delay on the basis of the integrated parallax calculated by the parallax calculation means 111 and the parallax produced by the MTD method which is outputted from the delay calculation means 110.

In the present embodiment, a stereoscopic space is reproduced, taking the depth estimate obtained by the CID method as a base. That is, a stereoscopic video obtained by adding occlusion produced by the MTD method to the CID method is presented. As a specific method, a phase (a parallax: a phase produced as a result by a field delay) calculated by the MTD method is subtracted from a phase (a parallax) for each area calculated by the CID method so that the phase for the area is equal to the phase calculated by the CID method even after the MRD method and the CID method are simultaneously used. Therefore, the phases produced by the MTD method and the CID method are controlled by the following priorities:

Priority 1 the maximum range Urange [pixel] of a phase set by a user

Priority 2 the limit of an image distortion h_supp_lev [pixel] caused by phase shift in a conversion image Priority 3 a depth shape (the shape of a depth estimate) estimated by the CID method Priority 4 a phase dly_sisa [pixel], produced by the MTD method, which does not exceed Urange Priority 5 a phase [pixel] produced by the CID method Description is now made of the meanings of the priorities.

The highest priority 1 ensures that the integrated phase does not exceed the maximum range Urange of the phase set by the user.

The priority 2 ensures that the distortion of an image produced by integrated phase control (particularly, the CID method) is within a given limit value (within h_supp_lev).

The priority 3 means that the depth estimate (depth shape) for each area calculated by the CID method is maintained even after the MTD method and the CID method are simultaneously used.

The priority 4 ensures that the parallax produced by the MTD method does not exceed Urange.

The lowest priority 5 means that the phase produced by the CID method takes a value different from the phase produced by the CID method alone by using the CID method together with the MTD method.

Figure 16:
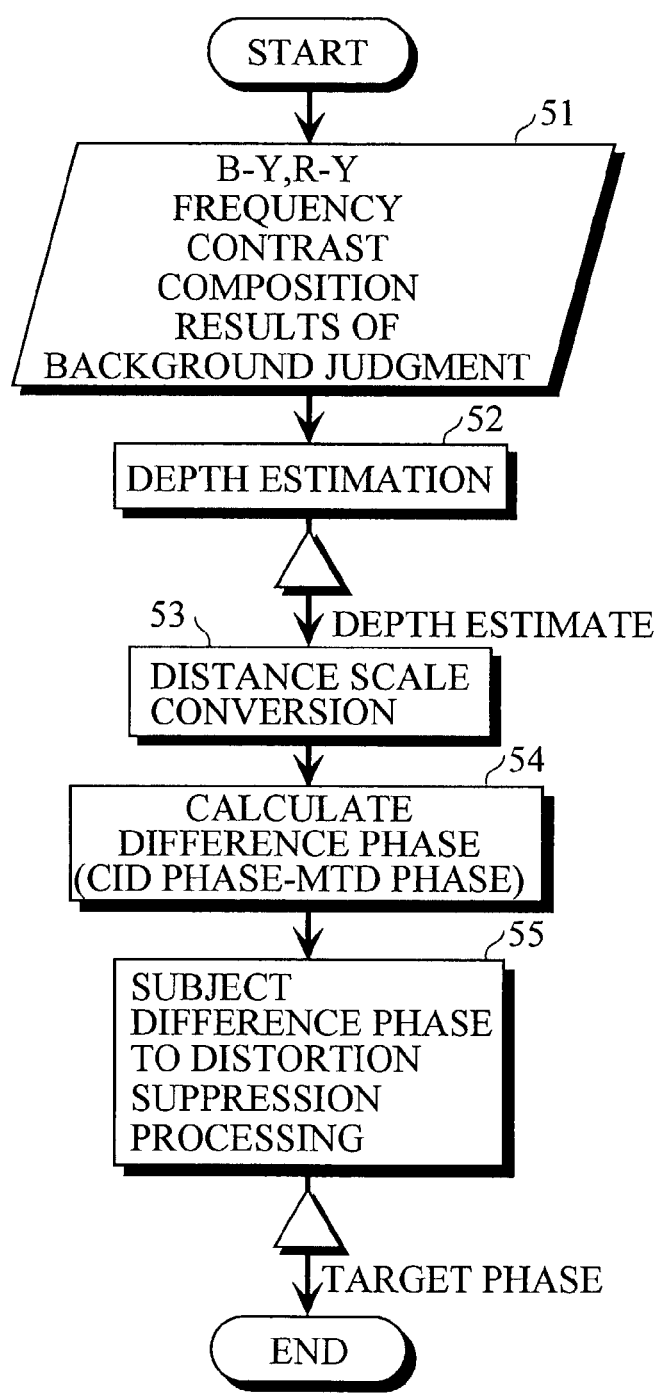
FIG. 16 is a flow chart showing the procedure for overall integrated phase control processing.
Figure 17:
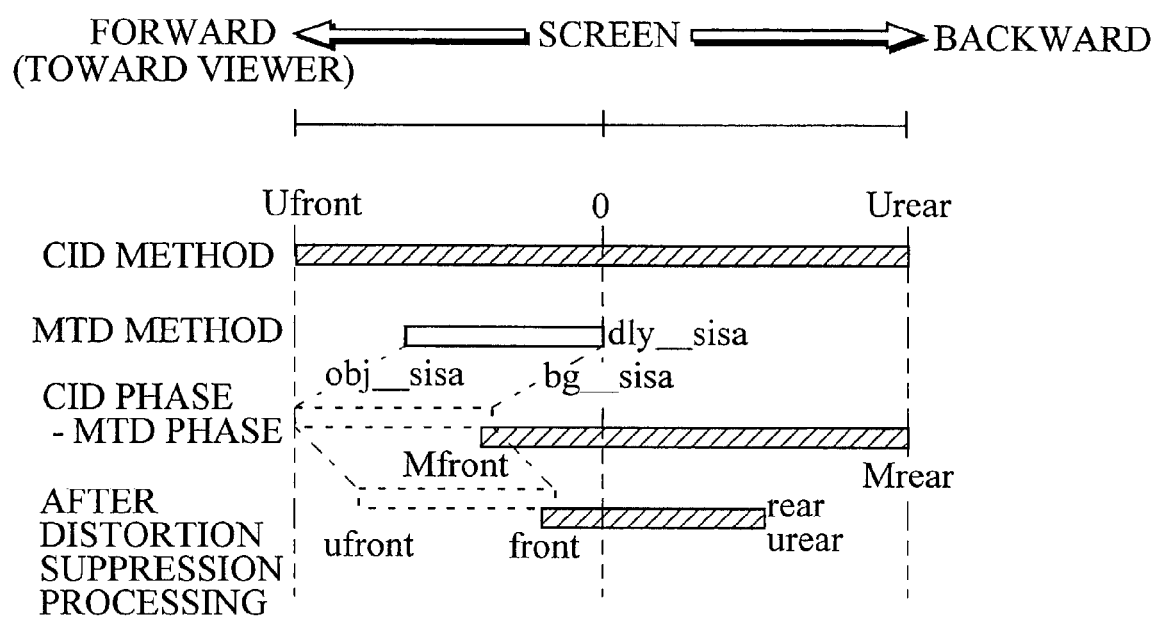
FIG. 17 is a schematic view showing overall behavior in integrated phase control.

FIG. 16 shows the procedure for integrated phase control processing with a depth shape estimated by the CID method maintained. FIG. 17 illustrates the behavior of a phase at the time of execution.

Image features are first extracted by the image feature extraction means 106 (step 51). The depth estimate calculation means 109 estimates a depth by the CID method on the basis of the image features extracted by the image feature extraction means 106 (step 52). That is, a calculated frequency, a contrast, a weight on a composition, and a weight on the results of subject/background judgment are added together at a suitable ratio, to find a depth estimate.

In the integrated phase control, the CID method is also used for a moving picture. Accordingly, the addition ratio is made variable depending on the speed of the movement in a video. Specifically, in order to compensate for the tendency of the value of a high-frequency component to decrease by rapid movement, the addition ratio of the high-frequency component is reduced as the speed of the movement increases.

The depth estimate thus found is subjected to distance scale conversion (complete distance scale conversion or polygonal line distance scale conversion) within Ufront and Urear, to find a phase for each area produced by the CID method (step 53). A difference phase is found by subtracting a phase produced by the MTD method (MTD phase) (=a field delay×the value of a horizontal motion vector in the area) from the phase produced by the CID method (CID phase) (step 54). The difference phase is subjected to distortion suppression processing such that the difference between the phases for the adjacent areas is not more than h_supp_lev [pixel] (step 55).

The reason why a right end of the MTD phase and a left end of the CID phase are overlapped with each other in the difference phase (=CID phase−MTD phase) shown in FIG. 17 is that the phases produced by both the methods differ for each area. This is apparent from the behavior of a difference phase ph_diffj (=ph_cidj−ph_mtdj) for the area obtained by subtracting a phase ph_mtdj for each area produced by the MTD method from a phase ph_cidj for the area produced by the CID method, as shown in FIG. 18. j indicates an area number.

Figure 18:
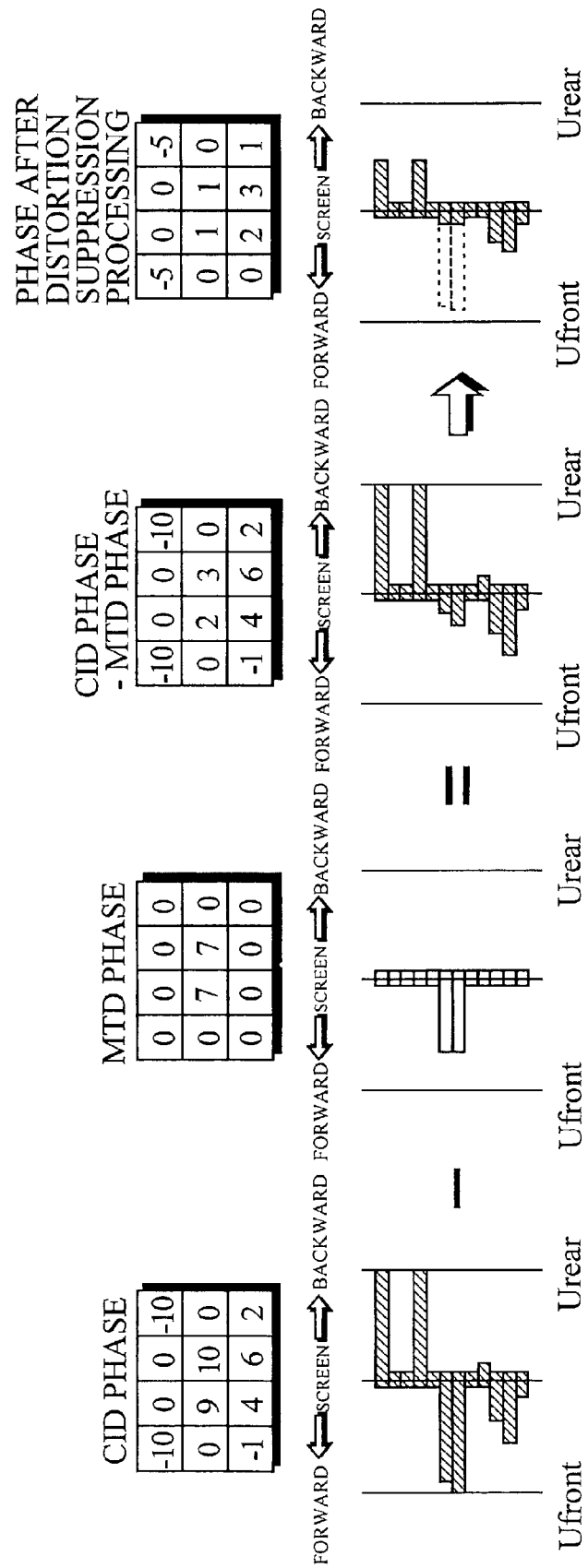
FIG. 18 is a schematic view showing behavior at each area at the time of integrated phase control.

In FIG. 18, values on three columns and four rows on the upper side respectively indicate phases in respective areas, and the phases in the respective areas are made visually understandable by being arranged in a single row on the lower side.

The phase after the distortion suppression processing shown in FIG. 17 indicates that the difference phase is subjected to the distortion suppression processing. The maximum projection phase front [pixel] and the maximum recession phase urear [pixel] of a phase obtained by integrating the MTD method and the CID method (an integrated phase) after the distortion suppression processing are found by loop processing shown in FIG. 19.

Figure 19:
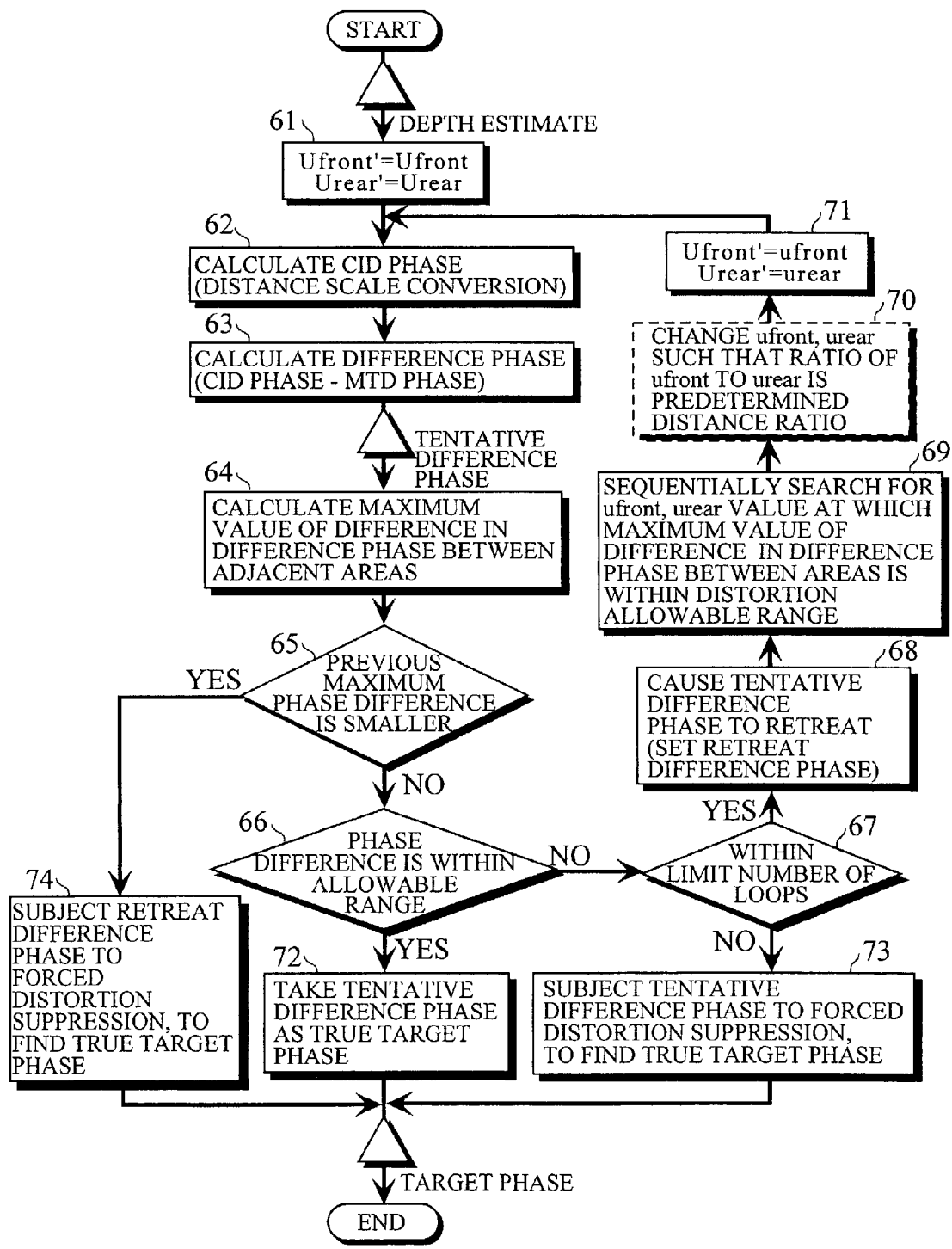
FIG. 19 is a flow chart showing the detailed procedure for processing at steps 53, 54, and 55 shown in FIG. 16.
Figure 20:
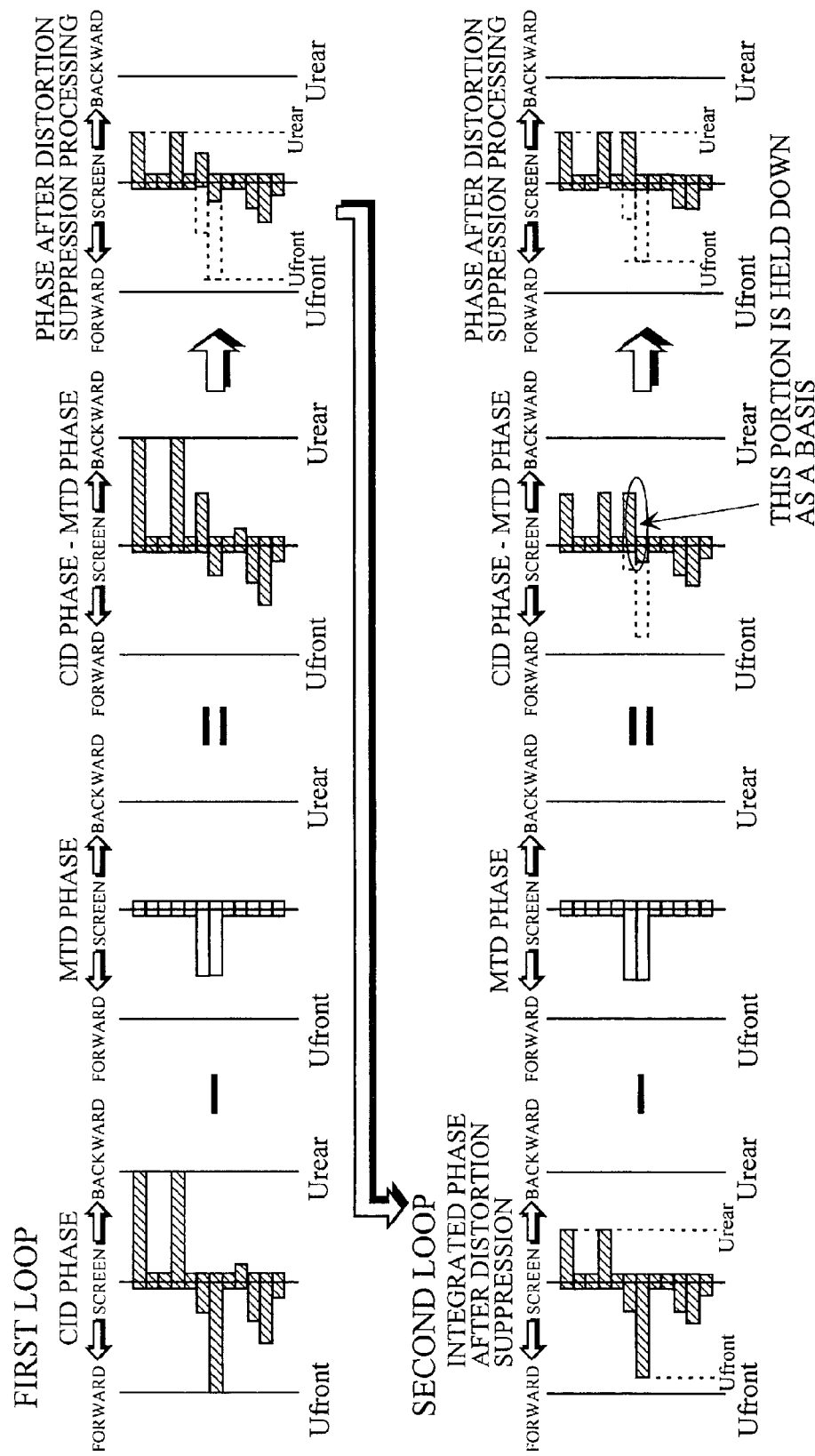
FIG. 20 is a schematic view showing an example of distortion suppression performed in integrated phase control.

FIG. 19 shows the details of the processing at the steps 53, 54, and 55 shown in FIG. 16. The processing is performed by the parallax calculation means 111.

Ufront and Urear set by the user are first respectively set to variables Ufront' and Urear' (step 61), and are then subjected to distance scale conversion in a dynamic range defined by Ufront' and Urear', to obtain a CID phase (step 62). A tentative difference phase obtained by subtracting an MTD phase from the CID phase is then found (step 63). The maximum value h_dv_max [pixel] of a phase difference between the adjacent areas found from the tentative difference phase (the maximum value of the difference in the phase difference between the adjacent areas) is found (step 64). The program then proceeds to the step 65.

When the maximum value h_dv_max [pixel] of the phase difference between the adjacent areas is not within a distortion allowable range h_supp_lev [pixel], as described later, the dynamic range is reduced such that the phase difference between the adjacent areas is within the distortion allowable range. Thereafter, the processing at the foregoing steps 62, 63, and 64 is performed again.

It is judged at the step 65 whether or not in a case where such loop processing is performed, the maximum value h_dv_max [pixel] of a phase difference calculated at the previous step 64 is smaller than the maximum value h_dv_max [pixel] of the phase difference calculated at the current step 64.

At the time point where the loop processing is not performed, the answer is in the negative at the step 65, to judge whether or not the maximum value h_dv_max [pixel] of the phase difference calculated at the current step 64 is within the distortion allowable range h_supp_lev [pixel] (step 66). If it is within the range, the tentative difference phase is taken as a true target phase (step 72).

Conversely, if it is outside the range, it is judged whether or not the number of loops is within the limit number of loops in order to reduce a load on a CPU (step 67). When the number of loops is larger than the limit number of loops, the tentative difference phase is subjected to forced distortion suppression processing, described later, to find a true target phase (step 73).

Furthermore, when the number of loops is smaller than the limit number of loops, the tentative difference phase is caused to retreat (step 68), and the dynamic range defined by Ufront' and Urear' is gradually reduced until the phase difference between the adjacent areas is not more than h_supp_lev, to obtain the most suitable values of ufront and urear (step 69). The processing shall be hereinafter referred to as sequential search processing. The details of the sequential search processing will be described later.

The distance ratio of ufront to urear, which are found in the sequential search processing, is changed into the distance ratio designated by the user (step 70). The obtained ufront and urear are set to Ufront' and Urear', to change the dynamic range (step 71). Thereafter, the program is returned to the step 62. At the step 62, the distance scale conversion is carried out again.

A series of processing at the step 62 to the step 71 is repeated until the maximum value h_dv_max [pixel] of the phase difference between the adjacent areas is within the distortion allowable range h_supp_lev [pixel], and the processing is interrupted halfway, to obtain a final target phase.

Two types of interruption of loop processing in FIG. 19 will be successively described.

First, the first interruption occurs when the number of loops reaches the limit number of loops in order to reduce the CPU load at the step 67. When the interruption occurs by the conditions, a tentative difference phase is subjected to distortion suppression processing in a pixel scale manner which is synonymous with the following equation (6), as shown in the following equation (21), to determine the values of ufront and urear, thereby range-converting a depth estimate within a range defined thereby.

$$u\_front = df\_ufront * h\_supp\_lev / h\_dv\_max \text{ for } h\_dv\_max > h\_supp\_lev$$

$$urear = df\_urear * h\_supp\_lev / h\_dv\_max \text{ for } h\_dv\_max > h\_supp\_lev \quad (21)$$

Here, df_ufront and df_urear respectively indicate the maximum value and the minimum value of the tentative difference phase, which shall be acquired at the step of calculating the maximum value of the difference in the phase difference between the adjacent areas. In such a way, the difference phase shall be accommodated within a range newly found. There is no problem even if ufront and urear in the foregoing equation (21) are subjected to distance ratio maintenance processing expressed by the following equation (22):

$$(255-Dlev): Dlev = \{lev(ufront)-Dlev\}: \{Dlev-lev(urear)\} \quad (22)$$

The second interruption occurs when in a case where the loop processing at the step 62 to the step 71 is performed at the step 65, the maximum value h_dv_max [pixel] of the phase difference calculated at the previous step 64 is smaller than the maximum value h_dv_max [pixel] of the phase difference calculated at the current step 64.

The interruption occurs when the maximum value h_dv_max of the phase difference between the adjacent areas in the current loop is not smaller than a value obtained in the previous loop irrespective of the fact that the dynamic range is sufficiently reduced. This occurs by the fact that a phase produced by the MTD method is not changed by the distortion suppression processing. That is, when the difference between the phases of a subject and a background which are produced by the MTD method is large, the dynamic range is not reduced upon being interrupted by the phase difference between the MTD phases even if the number of loops is increased. As a result, the phase difference is not more than h_supp_lev.

In such a case, the processing is interrupted, to change the dynamic range by the same processing as that at the step 73 (step 74). However, in this case, the dynamic range is changed with respect to the tentative retreat difference phase which is caused to retreat at the step 68. The dynamic range is changed with respect to the tentative retreat difference phase in order to reduce the tendency of the phase produced by the MTD method to affect the shape of the difference phase every time distortion suppression loops are overlapped with each other and of the dynamic range to reduce with respect to the difference phase.

However, such a method is symptomatic treatment. Accordingly, the frequency of occurrence of forced distortion suppression processing caused by the phase produced by the MTD method cannot be fundamentally reduced.

In order to reduce the frequency of occurrence of such a phenomenon, the phase difference in the MTD phase itself between the adjacent areas must be reduced. In the integrated phase control, therefore, used as the MTD phase ph_mtdj for each area is a value after smoothing a parallax which the area integrally has (=a field delay×the value of a horizontal motion vector in the area) together with a parallax between the adjacent areas.

In order to reduce the frequency of occurrence of the forced distortion suppression processing, the shapes of the phases respectively produced by the MTD method and the CID method must be similar to each other. Therefore, the depth estimation is performed in consideration of the results of subject/background judgment such that the CID phase is also increased in an area where the MTD phase is increased, as shown in FIG. 16, in the integrated phase.

The sequential search processing using the dynamic range at the step 69 shown in FIG. 19 will be described.

① Adjacent areas between which there is a maximum phase difference in difference phase is determined.

② The direction of search is determined. Specifically, the direction of search is determined depending on respective CID phases in the two areas, between which there is a maximum phase difference, determined in ①.

③ The values of ufront and urear are brought near to the value of a screen.

④ The two areas are subjected to distance scale conversion using a dynamic range defined by the values of ufront and urear which have been updated, to calculate the CID phases in the two areas.

⑤ A difference phase (=CID phase−MTD phase) in each of the two areas is calculated.

⑥ A phase difference h_dv_max in the difference phase between both the areas is calculated.

⑦ The phase difference h_dv_max found in ⑥ is judged in the following order:

1) When h_dv_max is not more than h_supp_lev, the processing is terminated.
2) When h_dv_max is more than h_v_max in the previous loop, the processing is terminated, taking a value to be found as the value of ufront or urear used in the previous loop.
3) When h_dv_max is more than h_supp_lev, the program is judged to ③.

A method of controlling a parallax (a phase) produced by the MTD method, which is carried out by the parallax monitoring means 112, will be then described.

Figure 21:
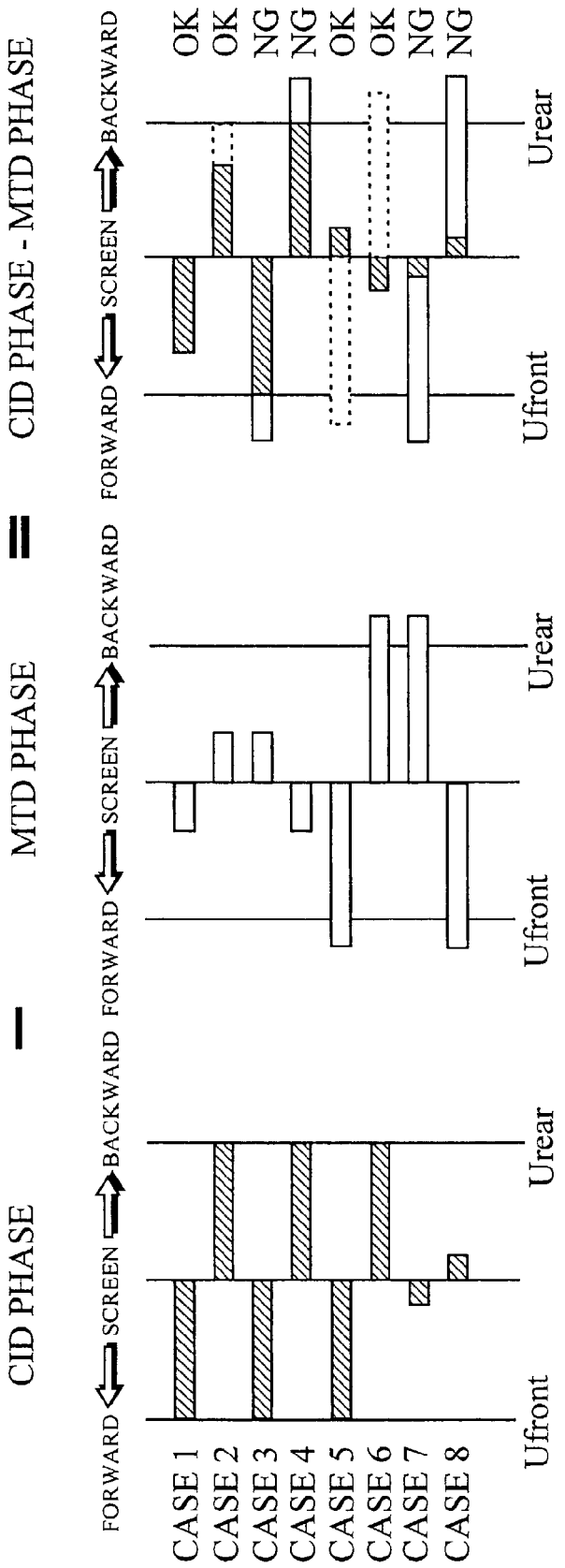
FIG. 21 is a schematic view showing a case where a phase must be adjusted by the MTD method and a case where it need not be adjusted.

In integrated phase control with stereoscopic reproducibility in the CID method maintained, subject position control is not used in the MTD method. Therefore, the phase produced by the MTD method may, in some cases, exceed the maximum projection phase Ufront [pixel] and the maximum recession phase Urear [pixel] which are previously determined by a user. The behavior of the phase in a case where such a phenomenon occurs is illustrated in FIG. 21. An OK mark and an NG mark at a right end in FIG. 21 respectively indicate that an integrated phase which is the sum of the MTD phase and the difference phase is within a dynamic range Urange previously determined by the user and that the integrated phase exceeds the dynamic range Urange.

In an NG case, the following problem arises.

When Urear is approximately the same as the distance between the eyes, a depth which is not less than the distance between the eyes cannot be defined in a distance scale. Further, when an NG phenomenon is maintained even after distortion suppression processing, the integrated phase cannot maintain the principle of stereoscopic reproduction within Urange which is its major premise.

In order to solve such a problem, a parallax Mdly_sisa for determining a stereoscopic effect produced by the MTD method can be previously set to a small value so that no NG phenomenon occurs. However, it is difficult to say that this method is preferable because the stereoscopic effect produced by the MTD method is lost. Therefore, such control that the occurrence of the NG phenomenon is recognized to some extent as compensation for increasing Mdly_sisa to reduce a target delay dly_target only when a phase exceeding Ufront and Urear is produced is required (see FIG. 22).

In order to suppress the phase within Urange in this method, values whose absolute values are smaller than the respective values must be processed as internal Ufront and Urear in anticipation of a surplus of the phase over Urange which is produced at the time of simultaneously using the MTD method in place of Ufront and Urear which are values set by the user from the beginning. Further, in a method of converting the distance scale using a parallax conversion table, a phase outside the conversion table must be so rounded as to be accommodated in the conversion table.

Figure 22:
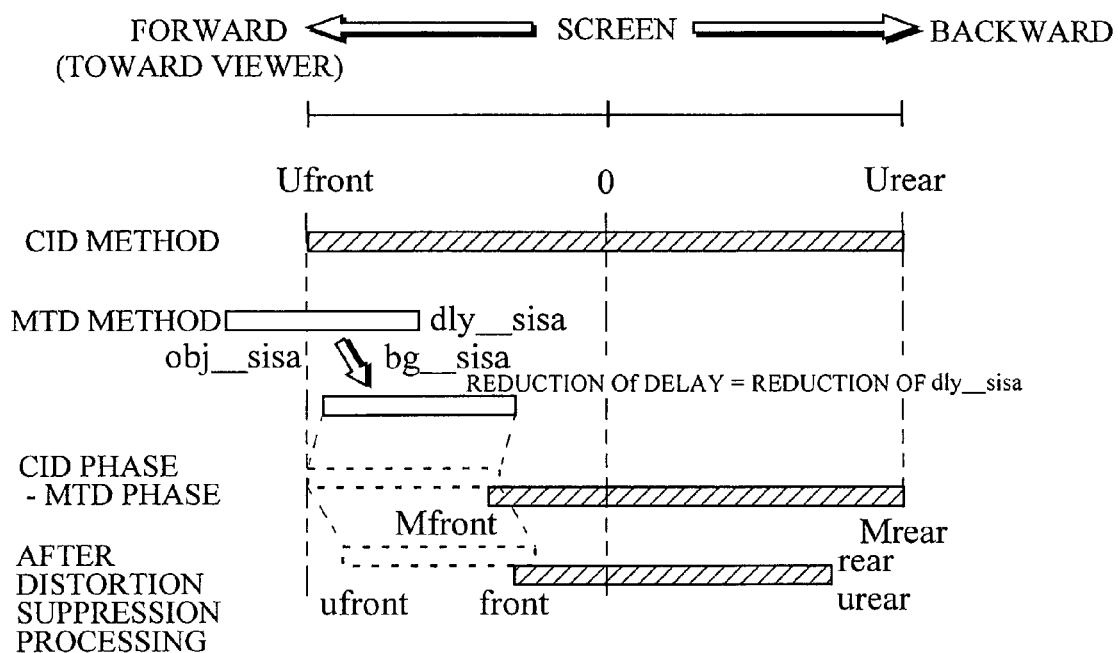
FIG. 22 is a schematic view for explaining phase suppression processing by the MTD method.

FIG. 23 shows the procedure for control processing (the procedure for control processing performed by the parallax monitoring means 112) for realizing the processing shown in FIG. 22.

In FIG. 23, a target delay is reduced when an integrated phase for each area (the sum of a real phase and a phase by a real delay) exceeds Ufront and Urear.

Therefore, respective phases produced by the MTD method in a subject area and a background area must be calculated for each field (step 81). The phase in the current field is calculated using a real phase phase [pixel] and a real delay delay [field] in order to improve precision.

In actual control, a real parallax obj_sisa' [pixel] in the subject area and a real parallax bg_sisa' [pixel] in the background area which are produced by a field delay in the MTD method, and a real parallax ng_sisa' [pixel] in an NG area (it is not clear to which of the areas the NG area belongs) are found by the following equation (23):

$$obj\_sisa'=obj\_vect*delay$$

$$bg\_sisa'=bg\_vect*delay$$

$$ng\_sisa'=(obj\_sisa'+bg\_sisa')/2 \quad (23)$$

As expressed by the following equation (24), the real parallax in each of the areas and a real phase rph_diffj [pixel] obtained by smoothing a true target phase in the area on a time basis are added together, thereby finding a real integrated phase u_phasej [pixel] in the area (step 82):

$$u\_phasej=obj\_sisa'+ph\_diffj \text{ for subject area}$$

$$u\_phasej=bg\_sisa'+ph\_diffj \text{ for background area}$$

$$u\_phasej=ng\_sisa'+ph\_diffj \text{ for NG area} \quad (24)$$

In order to determine whether the real integrated phase u_phase is within a range from Ufront to Urear set by the user, a phase over_phase [pixel] indicating how a phase in the area is spaced apart from that set by the user is found by the following equation (25) when the real integrated phase is outside the range (step 83):

$$over\_phasej=u\_phasej-Ufront \text{ for } u\_phasej>Ufront$$

$$over\_phasej=-(u\_phasej-Urear) \text{ for } Urear>u\_phasej$$

$$over\_phasej=0 \text{ for } Ufront \geq u\_phasej \geq Urear \quad (25)$$

The maximum value over map [pixel] of the phase over_phase in each of areas constituting one screen is then found, to perform target delay suppression processing for reducing a target delay when over_maxp is not zero (step 84).

In the target delay suppression processing, the phase over_maxp found in the foregoing equation (25) is first subtracted from the absolute value of the real parallax dly_sisa' [pixel] in the current field which is produced by a field delay, to find a parallax dly_sisa" which can be produced by the MTD method by the following equation (26):

$$dly\_sisa''=|dly\_sisa'|-over\_maxp=|obj\_sisa'-bg\_sisa'|-over\_maxp \quad (26)$$

The target delay dly_target' which is suppressed on the basis of the parallax dly_sisa" is found by the following equation (27):

$$dly\_target'=dly\_sisa''/(obj\_xvec-bg\_xvec) \text{ [field]} \quad (27)$$

A method in which the transition speed of a real delay changes depending on the difference between the real delay and a target delay is provided, to compare the target delay dly_target' and the target delay dly_target before the suppression, and take the smaller one of them as the final target delay dly_target" after the suppression. That is, the final target delay dly_target" after the suppression is expressed by the following equation (28):

$$dly\_target''=delay-1 \text{ for } 0<delay<dly\_target'$$

$$dly\_target''=delay+1 \text{ for } 0>delay>dly\_target'$$

$$dly\_target''=dly\_target' \text{ for } |delay|>|dly\_target'| \quad (28)$$

Although the phase produced by the MTD method was suppressed by the real delay and the real parallax, it can be also suppressed by the target phase and the target delay when a load on a CPU is given priority over precision.

The invention claimed is:

1. A device for converting a two-dimensional video into a three-dimensional video, characterized by comprising:
   a field memory for storing for each field a two-dimensional video signal inputted from a video signal source;
   motion vector detection means for detecting for each area of an input video a motion vector corresponding to movement between fields of the inputted video signal;

readout means for reading out, out of the video signals stored in the field memory, the video signal delayed from the inputted video signal by a delay found from the motion vector for each area detected by the motion vector detection means from the field memory;

switching means for outputting one of the inputted video signal and the video signal read out of the field memory and the other video signal, respectively, as a left eye video signal and a right eye video signal on the basis of the direction of a horizontal component of the motion vector for each area detected by the motion vector detection means;

feature extraction means for extracting for each area of the input video a video feature from the inputted video signal;

parallax calculation means for calculating, on the basis of the image feature for each area of the input video extracted by the feature extraction means, a depth for the area and calculating a parallax for the area from the calculated depth for the area;

parallax correction means for correcting the parallax for each area calculated by the parallax calculation means depending on the magnitude of the motion vector for the area detected by the motion vector detection means; and phase control means for correcting, on the basis of the parallax for each area corrected by the parallax correction means, phases for the area of the right eye video and the left eye video outputted by the switching means, and outputting the videos as a stereoscopic video signal.

2. The device for converting a two-dimensional video into a three-dimensional video according to claim 1, characterized in that the parallax correction means comprises means for calculating for each area a difference parallax obtained by subtracting from the parallax for the area calculated by the parallax calculation means the parallax dependent on the magnitude of the motion vector in the corresponding area, and means for calculating a difference parallax for each area by changing a dynamic range such that the maximum value of the difference in the difference parallax between the adjacent areas is within a predetermined range.

3. The device for converting a two-dimensional video into a three-dimensional video according to claim 2, characterized by comprising means for reducing, when the sum of the difference parallax for each area obtained by the parallax correction means and the parallax dependent on the magnitude of the motion vector in the corresponding area exceeds a predetermined range, a delay by an amount corresponding to the excess parallax.

4. A method of converting a two-dimensional video into a three-dimensional video, characterized by comprising:

a first step of storing for each field a two-dimensional video signal inputted from a video signal source in a field memory;

a second step of detecting for each area of an input video a motion vector corresponding to movement between fields of the inputted video signal;

a third step of reading out, out of the video signals stored in the field memory, a video signal delayed from the inputted video signal by a delay found from the motion vector for each area detected at the second step from the field memory;

a fourth step of outputting one of the inputted video signal and the video signal read out of the field memory and the other video signal, respectively, as a left eye video signal and a right eye video signal on the basis of the direction of a horizontal component of the motion vector for each area detected at the second step;

a fifth step of extracting for each area of the input video a video feature from the inputted video signal;

a sixth step of calculating, on the basis of the image feature for each area of the input video extracted at the fifth step, a depth for the area and calculating a parallax for the area from the calculated depth for the area;

a seventh step of correcting the parallax for each area calculated at the sixth step depending on the magnitude of the motion vector for the area detected at the second step; and an eighth step of correcting, on the basis of the parallax for each area corrected at the seventh step, phases for the area of the right eye video and the left eye video outputted at the fourth step, and outputting the videos as a stereoscopic video signal.

5. The method of converting a two-dimensional video into a three-dimensional video according to claim 4, characterized in that the seventh steps comprises the steps of calculating for each area a difference parallax obtained by subtracting from the parallax for the area calculated at the sixth step the parallax dependent on the magnitude of the motion rector in the corresponding area, and calculating a difference parallax for each area by changing a dynamic range such that the maximum value of the difference in the difference parallax between the adjacent areas is within a predetermined range.

6. The method of converting a two-dimensional video into a three-dimensional video according to claim 5, characterized by comprising the step of reducing, when the sum of the difference parallax for each area obtained at the seventh step and the parallax dependent on the magnitude of the motion vector in the corresponding area exceeds a predetermined range, a delay by an amount corresponding to the excess parallax.

7. A method of converting a two-dimensional video into a three-dimensional video, characterized by comprising:

a first step of extracting an image feature related to the long or short distance of a video from each of a plurality of parallax calculation areas set within one screen on the basis of a two-dimensional video signal, and producing a depth estimate for the parallax calculation area on the basis of the extracted image feature;

a second step of subjecting each of the depth estimates to distance scale conversion using a dynamic range defined by a predetermined maximum projection amount and a predetermined maximum recession amount, to find a tentative target phase for each of the parallax calculation areas;

a third step of finding the maximum value of a phase difference between the adjacent parallax calculation areas on the basis of the tentative target phase for each of the parallax calculation areas;

a fourth step of judging whether or not the maximum value of the phase difference between the adjacent parallax calculation areas is within a predetermined distortion allowable range; and a fifth step of searching, when the maximum value of the phase difference between the adjacent parallax calculation areas is outside the predetermined distortion allowable range, for such a dynamic range that the phase difference between said parallax calculation areas is within the distortion allowable range, subjecting each of the depth estimates to distance scale conversion using the dynamic range searched for, and finding a tentative target phase for each of the parallax calculation areas, to proceed to the third step.

8. The method of converting a two-dimensional video into a three-dimensional video according to claim 7, characterized in that at said fifth step, the dynamic range searched for is corrected such that the ratio of the maximum projection amount to the maximum recession amount, which are defined by the dynamic range, is a predetermined ratio, and each of the depth estimates is then subjected to distance scale conversion using the corrected dynamic range.

* * * * *